US012761512B2

(12) United States Patent
Sung et al.

(10) Patent No.: US 12,761,512 B2
(45) Date of Patent: Oct. 13, 2026

(54) DISPLAY DEVICE

(71) Applicants: Innolux Corporation, Miaoli County (TW); CARUX TECHNOLOGY PTE. LTD., Singapore (SG)

(72) Inventors: Li-Wei Sung, Tainan (TW); Cheng-Jen Chu, Miaoli County (TW); Hong-Sheng Hsieh, Miaoli County (TW); Yu-Chih Tseng, Miaoli County (TW); Yu-Cheng Hsiao, Miaoli County (TW)

(73) Assignees: Innolux Corporation, Miaoli County (TW); CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/806,710

(22) Filed: Aug. 16, 2024

(65) Prior Publication Data

US 2025/0093701 A1 Mar. 20, 2025

(30) Foreign Application Priority Data

Sep. 14, 2023 (CN) ......................... 202311187444.6

(51) Int. Cl.
*G02F 1/1335* (2006.01)
*G02F 1/1343* (2006.01)
*G09G 3/36* (2006.01)

(52) U.S. Cl.
CPC .. *G02F 1/133555* (2013.01); *G02F 1/133504* (2013.01); *G02F 1/134309* (2013.01); *G09G 3/3655* (2013.01); *G09G 2300/0408* (2013.01); *G09G 2300/0456* (2013.01)

(58) Field of Classification Search
CPC ......... G02F 1/133555; G02F 1/133504; G02F 1/134309; G02F 1/133502; G09G 3/3655; G09G 2300/0408; G09G 2300/0456
See application file for complete search history.

(56) References Cited

U.S. PATENT DOCUMENTS 9,625,639 B2 * 4/2017 Oh ........................ G02B 6/0003
2004/0217932 A1 * 11/2004 Nally .................... G09G 3/2011
345/92
2008/0239178 A1 * 10/2008 Nagai ............... G02F 1/133555
349/33

(Continued)

FOREIGN PATENT DOCUMENTS

TW 200710484 3/2007
TW 201636702 10/2016

*Primary Examiner* — Donald L Raleigh
(74) *Attorney, Agent, or Firm* — JCIPRNET

(57) ABSTRACT

A display device has a transmissive area and a reflective area. The transmissive area corresponds to a first sub-pixel, and the reflective area corresponds to a second sub-pixel. The display device includes a backlight module, a liquid crystal module, and an anti-reflective layer. The liquid crystal module is disposed on the backlight module and includes a first substrate, a component layer, and a reflective layer. The component layer is disposed on the first substrate and includes a first transistor and a second transistor. The first transistor is configured to drive the first sub-pixel, and the second transistor is configured to drive the second sub-pixel. The reflective layer is disposed on the component layer and corresponds to the reflective area. The anti-reflective layer is disposed on the liquid crystal module.

17 Claims, 17 Drawing Sheets

(56) References Cited

U.S. PATENT DOCUMENTS

| | | | | |
|---|---|---|---|---|
| 2016/0299381 | A1* | 10/2016 | Lu | G02F 1/133553 |
| 2017/0192315 | A1* | 7/2017 | Kim | G02F 1/133707 |
| 2018/0314109 | A1* | 11/2018 | Sakai | G02F 1/133502 |
| 2019/0094624 | A1* | 3/2019 | Kim | G02F 1/133617 |
| 2019/0137802 | A1* | 5/2019 | Yamada | G02F 1/134309 |
| 2019/0371421 | A1* | 12/2019 | Zheng | G09G 3/006 |
| 2020/0089052 | A1* | 3/2020 | Chen | G02F 1/1347 |
| 2020/0254729 | A1* | 8/2020 | Sugawara | B05D 7/24 |
| 2020/0309995 | A1* | 10/2020 | Wells | G02B 1/111 |

* cited by examiner

M1:G, SL, CL
M2:S, D, DL, SC
G:G1, G2
S:S1, S2
D:D1, D2
SC:SC1, SC2
SE:SE1, SE2
SL:SL1, SL2
PE:PE1, PE2
PX:PX1, PX2
TFT:TFT1, TFT2

DISPLAY DEVICE

CROSS-REFERENCE TO RELATED APPLICATION

This application claims the priority benefit of China application serial no. 202311187444.6, filed on Sep. 14, 2023. The entirety of the above-mentioned patent application is hereby incorporated by reference herein and made a part of this specification.

BACKGROUND

Technical Field

The disclosure relates to a display device, and in particular, relates to a transflective display device.

Description of Related Art

In an existing transflective display device, a bump structure is generally provided in the reflective area to adjust the reflectivity at a corresponding viewing angle and/or the relative relationship between the liquid crystal cell gaps between the reflective area and the transmissive area, so that the transflective display device may exhibit improved optical performance. However, the formation process of the bump structure is difficult, and the size of each formed bump structure is difficult to be the same, so the process yield of the transflective display device is affected.

Further, in the existing transflective display device, the same signal is used to drive the sub-pixels arranged in the reflective area and the transmissive area. However, the required signals for achieving improved optical performance in the reflective area and the transmissive area are different, making it difficult for the reflective area and the transmissive area in the transflective display device to simultaneously exhibit improved optical performance.

SUMMARY

The disclosure provides a display device requiring a simple formation process, providing a high process yield, and/or capable of exhibiting improved optical performance.

Some embodiments of the disclosure provide a display device having a transmissive area and a reflective area. The transmissive area corresponds to a first sub-pixel, and the reflective area corresponds to a second sub-pixel. The display device includes a backlight module, a liquid crystal module, and an anti-reflective layer. The liquid crystal module is disposed on the backlight module and includes a first substrate, a component layer, and a reflective layer. The component layer is disposed on the first substrate and includes a first transistor and a second transistor. The first transistor is configured to drive the first sub-pixel, and the second transistor is configured to drive the second sub-pixel. The reflective layer is disposed on the component layer and corresponds to the reflective area. The anti-reflective layer is disposed on the liquid crystal module.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
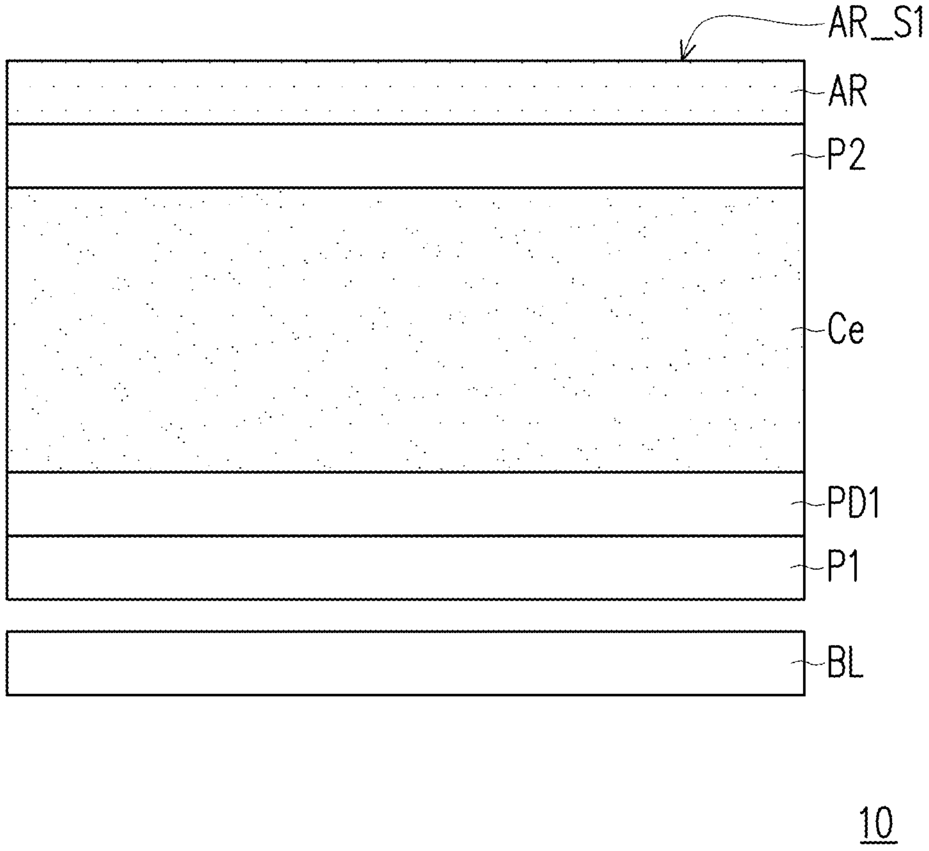
FIG. 1 is a schematic cross-sectional view of a display device according to a first embodiment of the disclosure.

Descriptions of the disclosure are given with reference to the exemplary embodiments illustrated by the accompanying drawings. Wherever possible, the same reference numerals are used in the drawings and the description to refer to the same or like parts.

The disclosure may be understood by referring to the following detailed description with reference to the accompanying drawings. It is noted that for comprehension of the reader and simplicity of the drawings, in the drawings provided in the disclosure, only a part of the electronic device is shown, and certain devices in the drawings are not necessarily drawn to actual scale. Moreover, the quantity and the size of each device in the drawings are only schematic and exemplary and are not intended to limit the scope of protection provided in the disclosure.

Certain terminologies will be used to refer to specific devices throughout the specification and the appended claims of the disclosure. People skilled in the art should understand that manufacturers of electronic devices may refer to same elements under different names. The disclosure does not intend to distinguish devices with the same functions but different names. In the following specification and claims, the terminologies “including,” “containing,” “having,” etc. are open-ended terminologies, so they should be interpreted to mean “including but not limited to . . . ”. Therefore, when the terms“including,” “containing,” and/or “having” are used in the description of the disclosure, the terminologies designate the presence of a corresponding feature, region, step, operation, and/or element, but do not exclude the presence of one or more corresponding features, regions, steps, operations, and/or elements.

Directional terminologies mentioned herein, such as “top”, “bottom”, “front”, “back”, “left”, “right”, and so forth, refer to directions in the accompanying reference drawings. Accordingly, the directional terminologies provided herein serve to describe rather than limiting the disclosure. In the accompanying drawings, each figure illustrates methods applied in particular embodiments and general features of structures and/or materials in the embodiments. However, these figures should not be construed or defined as the scope covered by the particular embodiments. For instance, relative dimensions, thicknesses, and positions of various layers, regions, and/or structures may be reduced or enlarged for clarity.

When a corresponding element (such as a film layer or a region) is referred to as being “on another element”, the element may be directly on the other element or there may be another element between the two. On the other hand, when an element is referred to as being “directly on another element”, there is no element between the two. Also, when an element is referred to as being “on another element”, the two have a top-down relationship in the top view direction, and the element may be above or below the other element, and the top-down relationship depends on the orientation of the device.

The terms “equal to” or “same” and “substantially” or “approximately” are generally interpreted as being within 10% of a given value or range, or interpreted as being within 5%, 3%, 2%, 1%, or 0.5% of a given value or range.

Terms such as “first” and “second” used in the specification and the claims are used to modify elements, and the terminologies do not imply and represent that the element(s) have any previous ordinal numbers, nor do they represent the order of a certain element and another element or the order of a manufacturing method. The use of the ordinal numbers is only used to clearly distinguish between an element with a certain name and another element with the same name. The claims and the specification may not use the same terminologies. Accordingly, in the specification, a first element may be a second element in the claims.

It should be understood that the following embodiments may replace, reorganize, and mix the features in several different embodiments to complete other embodiments without departing from the spirit of the disclosure. As long as the features of the embodiments do not violate the spirit of the disclosure or conflict each other, they may be mixed and matched as desired.

An electrical connection or coupling relationship described in this disclosure may refer to a direct connection or an indirect connection. In the case of the direct connection, end points of the elements on two circuits are directly connected or connected to each other by a conductor segment, and in the case of the indirect connection, there are switches, diodes, capacitors, inductors, resistors, other appropriate elements, or a combination of the above elements between the end points of the elements on the two circuits, which should not be construed as a limitation in the disclosure.

In this disclosure, measurement of thickness, length, width, and area may be done by applying an optical microscope, and the thickness or the width may be obtained by measuring a cross-sectional image in an electron microscope, which should not be construed as a limitation in the disclosure. In addition, certain errors between any two values or directions for comparison may be acceptable. If a first value is equal to a second value, it implies that there may be an error of about 10% between the first value and the second value. If a first direction is perpendicular to a second direction, an angle difference between the first direction and the second direction may be between 80 degrees and 100 degrees; if the first direction is parallel to the second direction, an angle difference between the first direction and the second direction may be between 0 degrees and 10 degrees.

A display device of the disclosure may be a non-self-luminous display device or a self-luminous display device and may be a double-sided display device. The display device may include, for example, liquid crystal, a light emitting diode (LED), a quantum dot (QD), fluorescence, phosphor, other suitable display media, or a combination thereof. The LED may include, for example, an organic light emitting diode (OLED), a micro-LED, a mini LED, micro LED, or a quantum dot LED (QDLED), but it is not limited thereto. Note that the display device may be any combination of the foregoing, but it is not limited thereto. Further, an appearance of the display device may be rectangular, circular, polygonal, or a shape with curved edges, or other suitable shapes. The display device may have a peripheral system such as a driving system, a control system, a light source system.

FIG. 1 is a schematic cross-sectional view of a display device according to a first embodiment of the disclosure.

With reference to FIG. 1, a display device 10 of this embodiment includes a backlight module BL, a liquid crystal module Ce, and an anti-reflective layer AR. In this embodiment, the display device 10 may be a transflective display device, but the disclosure is not limited thereto.

The backlight module BL may include, for example, a reflective sheet (not shown), a light guide plate (not shown), a light source (not shown), a diffusion sheet (not shown), a brightness enhancement film (not shown), and other suitable members, where the reflective sheet, the light guide plate, the diffusion sheet, and the brightness enhancement film may be stacked in this order, for example, but the disclosure is not limited thereto. The light source is used to, for example, provide light to the liquid crystal module Ce. In some embodiments, the light source may be an edge-type light source or a direct-type light source, but the disclosure is not limited thereto. The light guide plate has, for example, high light transmittance, and may be used, for example, to guide a direction in which light travels. In detail, the light provided by the light source may be transmitted, for example, in the light guide plate and provided to the liquid crystal module Ce. The reflective sheet has, for example, high reflectivity, and may be used to, for example, reflect the light passing through the light guide plate back into the light guide plate, so that efficiency of light using in the liquid crystal module Ce is increased. The diffusion sheet is used to diffuse the light from the light guide plate and has high light transmittance and/or is used to cover defects, for example. Based on the above, the liquid crystal module Ce may receive uniform light from the diffuser, so that the liquid crystal module Ce may have a relatively wide viewing angle. The brightness enhancement film may include, for example, a prism sheet, a reflective polarizing brightness enhancement film (dual brightness enhancement film, DBEF), or a combination thereof, and may be used to, for example, improve the utilization efficiency of light from the light guide plate.

The liquid crystal module Ce may be, for example, a transflective liquid crystal display module, and detailed description of a structure of the liquid crystal module Ce is to be provided in the following embodiments.

The anti-reflective layer AR is disposed on the liquid crystal module Ce, for example. The anti-reflective layer AR may be used to, for example, reduce reflectivity of ambient light from the outside on a surface of the display device and increase reflection efficiency of a reflective layer in the liquid crystal module Ce, so as to improve image quality displayed by the display device 10. The anti-reflective layer AR reduces the reflectivity of ambient light from the outside in the following manner, but the disclosure is not limited thereto. The anti-reflective layer may include high refractive index sub-layers and low refractive index sub-layers that are stacked in an alternating manner. For instance, when ambient light from the outside illuminates the anti-reflective layer AR, first reflected light reflected by a surface AR_S1 of the anti-reflective layer AR away from the liquid crystal module Ce and second reflected light reflected by an interface (it can be, for example, an interface between the high refractive index sub-layer and the low refractive index sub-layer in the anti-reflective layer AR) between the remaining film layers in the anti-reflective layer AR may be generated. The first reflected light and the second reflected light have substantially opposite phases, so that destructive interference occurs between the first reflected light and the second reflected light, amplitude of total reflected light reflected by the anti-reflective layer AR is thereby reduced, and the effect of reducing the reflectivity is achieved.

In this embodiment, the anti-reflective layer AR may include a combination of an anti-reflective film (not shown) and a cover plate (not shown). For instance, the anti-reflective layer AR may be formed by attaching the anti-reflective film to the cover plate. Alternatively, the anti-reflective layer AR may be formed by first coating an anti-reflective material on the cover plate and then curing it to form the anti-reflective film. In some embodiments, a material of the cover plate may include glass, plastic, or a combination thereof. Herein, the material of the cover plate may include aluminosilicate glass, lithium aluminosilicate glass, soda-lime silicate glass, aluminosilicate glass, quartz glass, or other light-transmitting glass. Alternatively, the material of the cover plate may include resin, acrylic, or other suitable plastic materials. The cover may include, for example, dust-proof, scratch-proof, and waterproof air intrusion effects to reduce the impact of the external environment on the internal members of the display device 10, and may be, for example, light-transmissive. In this embodiment, the cover plate has a specific haze, so that the anti-reflective layer AR may have, for example, a haze greater than or equal to 30% (≥30%). For instance, the haze of the anti-reflective layer AR may be 30%, 40%, 50%, 60%, 70%, 80%, 90%, any value between the aforementioned values, or a range of values consisting of any values, but the disclosure is not limited thereto. Through this design, brightness of the display device 10 may be evenly distributed at various viewing angles, while still having relatively high brightness under a wider viewing angle. That is, the arrangement of the anti-reflective layer AR may effectively improve optical performance of the display device 10, and thereby, may provide consumers with an improved visual experience. The definition of haze may be, for example, a percentage of scattered light flux after the light is scattered by the anti-reflective layer AR to the total light flux of the light passing through the anti-reflective layer AR (i.e., the sum of scattered light flux and collimated light flux).

In some embodiments, the display device 10 further includes a lower polarizing layer P1, an upper polarizing layer P2, and a phase difference film PD1.

The lower polarizing layer P1 is disposed between the backlight module BL and the liquid crystal module Ce, for example. In some embodiments, the lower polarizing layer P1 may have a sandwich structure or a stacked structure. For instance, the lower polarizing layer P1 may have polarized photons (not shown) and two protective layers (not shown) disposed on opposite surfaces of the polarized photons, but the disclosure is not limited thereto. In some other embodiments, the lower polarizing layer P1 may only have polarized photons and a protective layer (not shown) disposed on one surface of the polarized photons (not shown). The polarized photons may be a film with properties such as light transmission and light deflection, and a material of the polarized photons may be, for example, polyvinyl alcohol (PVA), but the disclosure is not limited thereto. The protective layer may be used to, for example, support and protect the polarized photons to increase mechanical strength of the lower polarizing layer P1. A material of the protective layer may be, for example, tri-acetyl cellulose (TAC), polymethyl methacrylate (acrylic), or polyethylene terephthalate, but the disclosure is not limited thereto.

The upper polarizing layer P2 may be disposed between the anti-reflective layer AR and the liquid crystal module Ce, for example. A structure and a material of the upper polarizing layer P2 may be, for example, the same as or similar to the structure and the material of the lower polarizing layer P1, so description thereof is not repeated herein.

The phase difference film PD1 is disposed between the lower polarizing layer P1 and the liquid crystal module Ce, for example. In some embodiments, the phase difference film PD1 may include a half-wave plate (HWP), a quarter-wave plate (QWP), or a combination thereof. In some embodiments, the quarter-wave plate is disposed between the lower polarizing layer P1 and the liquid crystal module Ce, and the half-wave plate may be disposed between the quarter-wave plate and the lower polarizing layer P1 or may not be disposed, but the disclosure is not limited thereto. The phase difference film PD1 may be used to, for example, adjust a polarization state of light.

In some embodiments, the liquid crystal module Ce in the display device 10 may include, for example, the following aspects. However, the disclosure is not limited thereto.

Figure 2A:
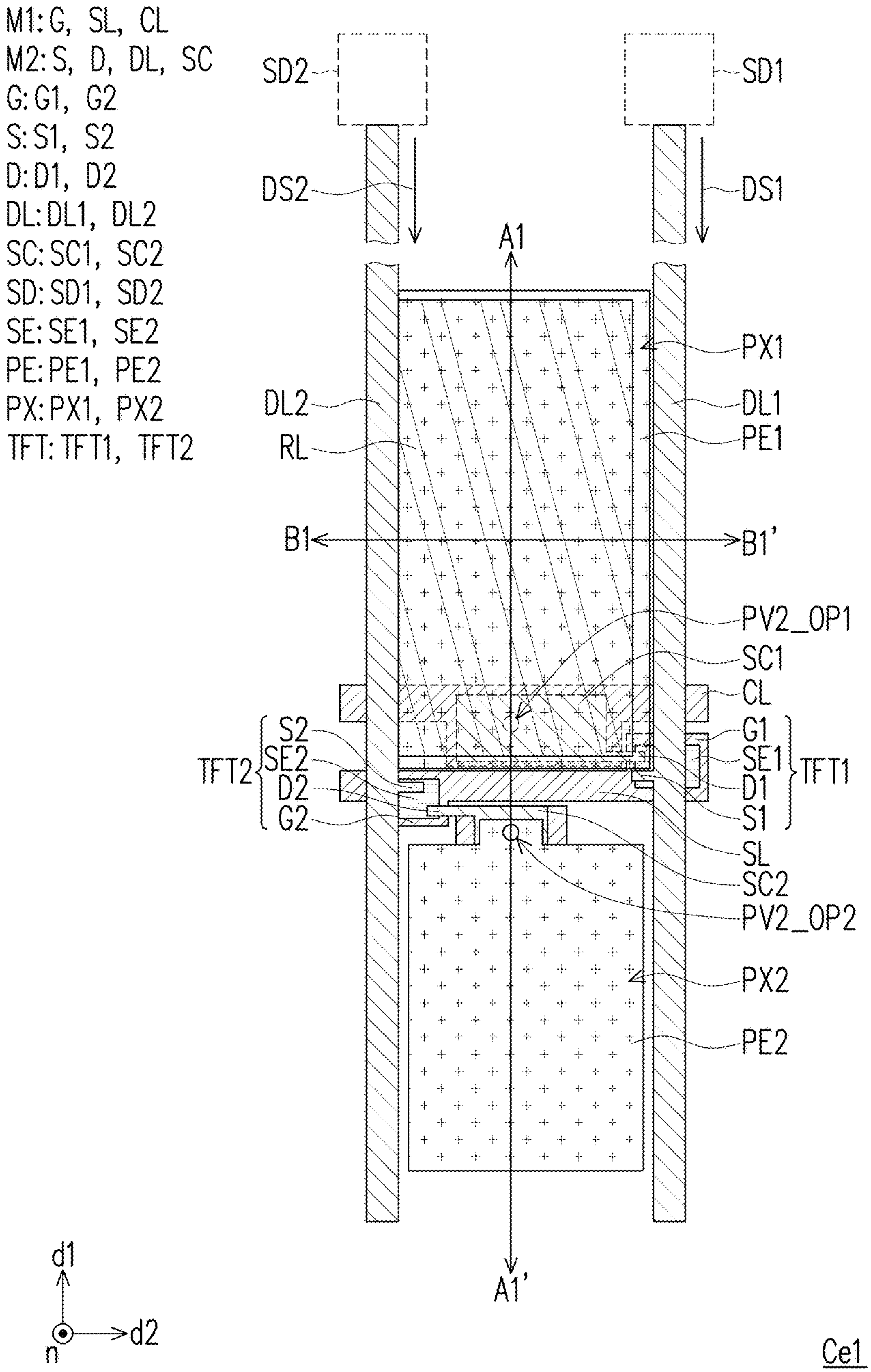
FIG. 2A is a schematic top view of a liquid crystal module according to the first embodiment of the disclosure.
Figure 2B:
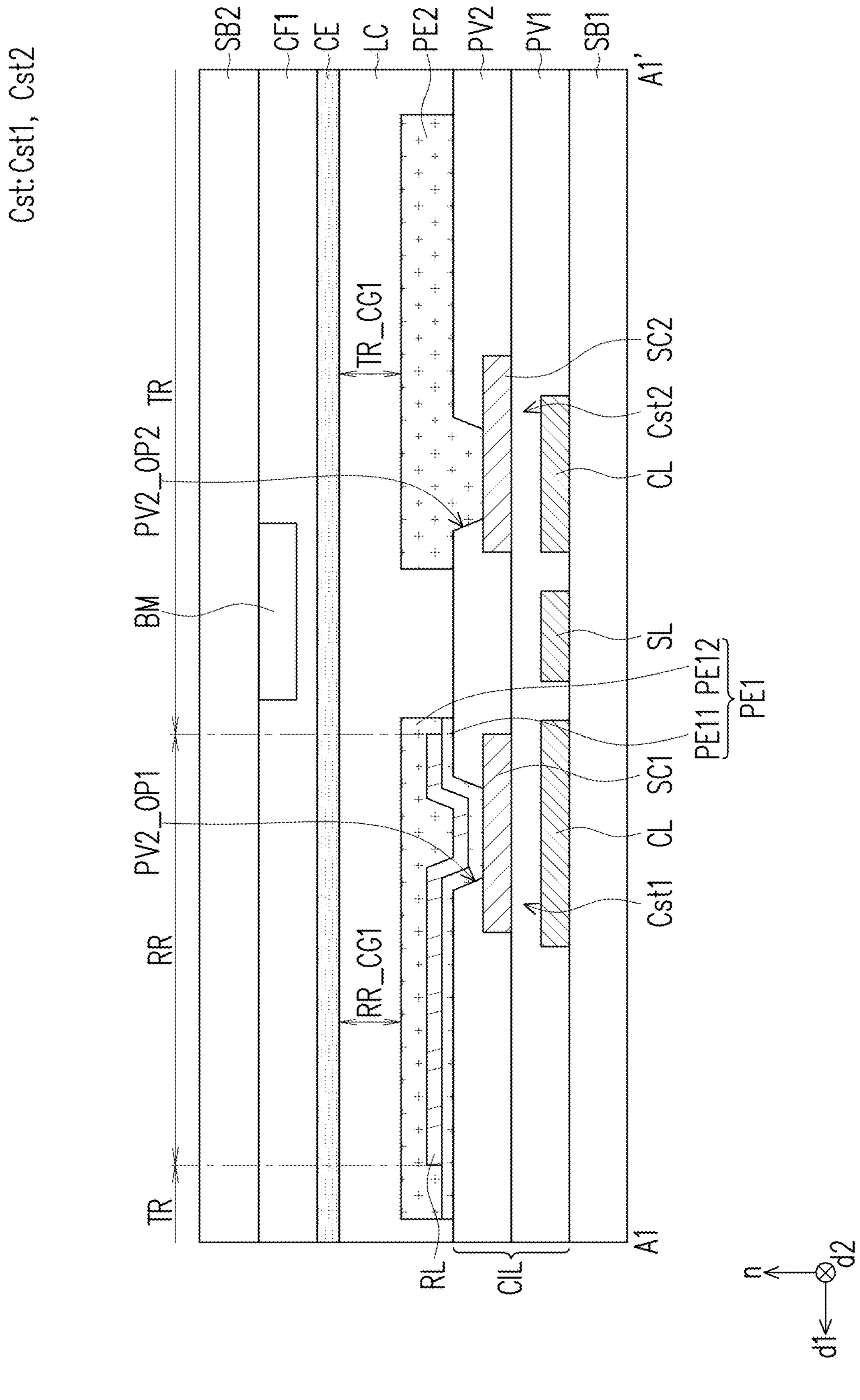
FIG. 2B is schematic top view taken along a cross-section line A1-A1' of FIG. 2A according to an embodiment.
Figure 2C:
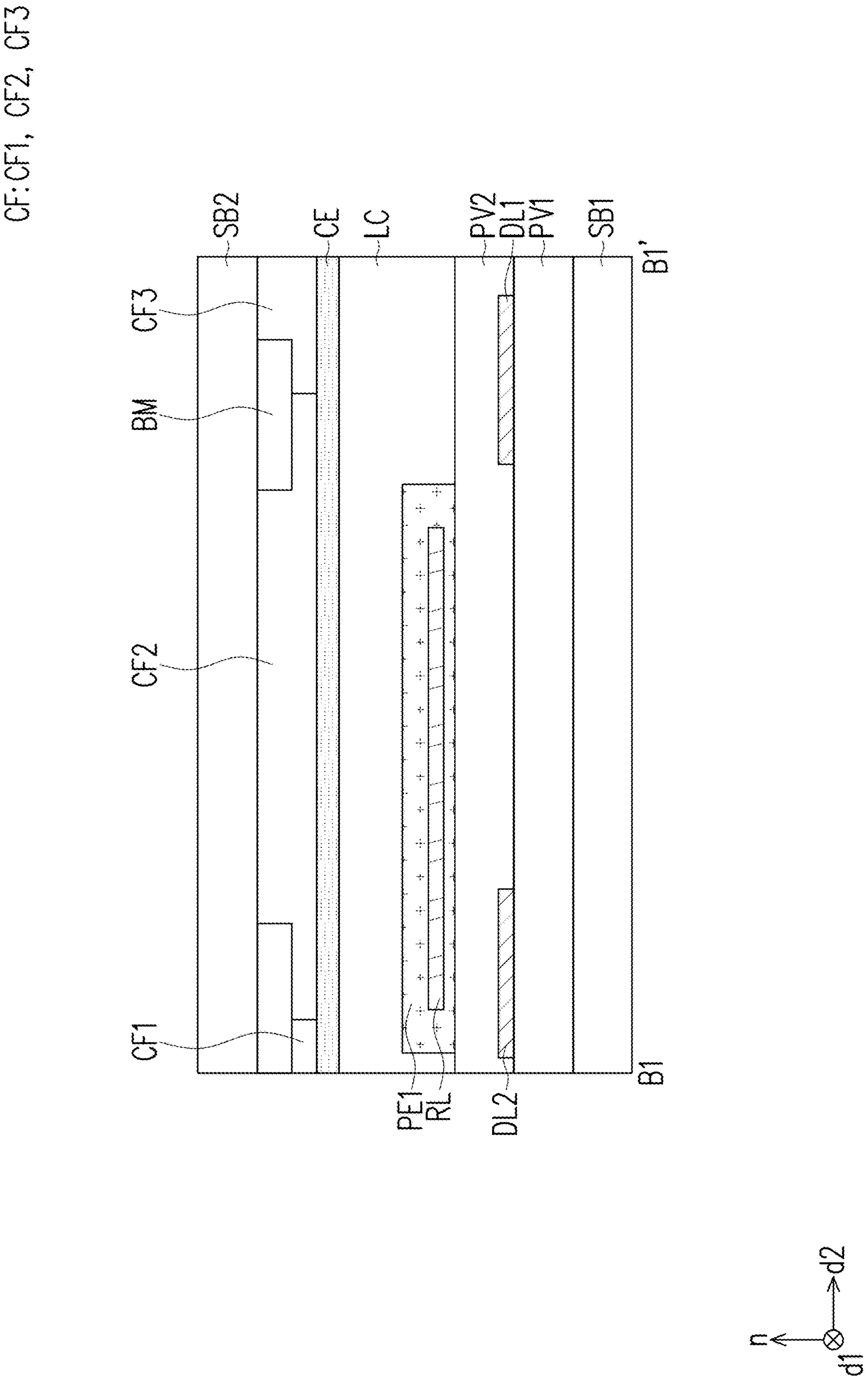
FIG. 2C is schematic top view taken along a cross-section line B1-B1' of FIG. 2A according to an embodiment.

FIG. 2A is a schematic top view of a liquid crystal module according to the first embodiment of the disclosure, FIG. 2B is schematic top view taken along a cross-section line A1-A1' of FIG. 2A according to an embodiment, and FIG. 2C is schematic top view taken along a cross-section line B1-B1' of FIG. 2A according to an embodiment.

With reference to FIG. 2A, FIG. 2B, and FIG. 2C, in this embodiment, a liquid crystal module Ce1 includes a substrate SB1, a component layer CIL, and a reflective layer RL. From another perspective, the display device 10 has, for example, a plurality of sub-pixels PX, where the sub-pixel located in a reflective area RR is a sub-pixel PX1, and the sub-pixel located in a transmissive area TR is a sub-pixel PX2. The sub-pixel PX1 and the sub-pixel PX2 may have a same color. The sub-pixel PX1 and the sub-pixel PX2 are adjacent to each other, for example, in a first direction d1, but the disclosure is not limited thereto. The sub-pixel PX1 and the sub-pixel PX2 may be defined by scan lines SL and data lines DL arranged in an alternating manner, for example.

The substrate SB1 may be, for example, a flexible substrate or a non-flexible substrate. A material of the substrate SB1 may include, for example, glass, plastic, or a combination thereof. For instance, the material of the substrate SB1 may include quartz, sapphire, polymethyl methacrylate (PMMA), polycarbonate (PC), polyimide (PI), polyethylene terephthalate (PET), other appropriate materials, or a combination of the above materials, but the disclosure is not limited thereto.

The component layer CIL may include, for example, at least one conductive layer and at least one insulating layer. In this embodiment, the component layer CIL includes a transistor TFT, a scan line SL, a common wire CL, a data line DL, a storage electrode SC, a first insulating layer PV1, and a second insulating layer PV2, but the disclosure is not limited thereto.

The transistor TFT is disposed on the substrate SB1, for example. In this embodiment, the transistor TFT includes a transistor TFT1 used to drive the sub-pixel PX1 and a transistor TFT2 used to drive the sub-pixel PX2. Herein, the transistor TFT1 includes a gate G1, a source S1, a drain D1, and a semiconductor layer SE1, and the transistor TFT2 includes a gate G2, a source S2, a drain D2, and a semiconductor layer SE2, but the disclosure is not limited thereto. In some embodiments, a material of the semiconductor layer SE1 and the semiconductor layer SE2 includes low temperature polysilicon (LTPS), metal oxide, amorphous silicon (a-Si), or a combination of the foregoing, but the disclosure is not limited thereto. For instance, the material of the semiconductor layer SE1 and the semiconductor layer SE2 may include but not limited to amorphous silicon, polycrystalline silicon, germanium; a compound semiconductor (e.g., gallium nitride, silicon carbide, gallium arsenide, gallium phosphide, indium phosphide, indium arsenide, and/or indium antimonide), an alloy semiconductor (e.g., a SiGe alloy, GaAsP alloy, AlInAs alloy, AlGaAs alloy, GaInAs alloy, GaInP alloy, and GaInAsP alloy), or a combination of the foregoing. The material of the semiconductor layer SE1 and the semiconductor layer SE2 may also include but not limited to metal oxide such as indium gallium zinc oxide (IGZO), indium zinc oxide (IZO), indium gallium zinc oxide (IGZTO), or organic semiconductor containing polycyclic aromatic compounds, or a combination of the foregoing. The gate G1, for example, at least partially overlaps the semiconductor layer SE1 in a normal direction n of the substrate SB1, and the gate G2, for example, at least partially overlaps the semiconductor layer SE2 in the normal direction n of the substrate SB1. The source S1 and the drain D1 are separated from each other, for example, and the source S2 and the drain D2 are also separated from each other, for example. The source S1 and the drain D1 (or the source S2 and the drain D2) may cover at least part of the semiconductor layer SE1 (or the semiconductor layer SE2) and be electrically connected to the semiconductor layer SE1 (or the semiconductor layer SE2). It is worth noting that the transistor TFT is any bottom gate type thin film transistor well known to a person having ordinary skill in the art. However, although the bottom gate type thin film transistor is used as an example in this embodiment, the disclosure is not limited thereto. In some embodiments, the transistor TFT may be, for example, a top gate type transistor, a dual gate type transistor, or other suitable transistors.

The scan line SL is, for example, disposed on the substrate SB1 and extends toward the first direction d1, for example, but the disclosure is not limited thereto. The scan line SL and a gate G of the transistor TFT belong to the same conductive layer, for example, and the data line SL may be, for example, electrically connected to the gate G of the transistor TFT, for example, to provide a scan signal from a gate driver (not shown) to the corresponding transistor TFT to turn on the corresponding transistor TFT. In this embodiment, the scan line SL is electrically connected to the transistor TFT1 and the transistor TFT2 and can determine to turn on the transistor TFT1 and/or the transistor TFT2 through a sequence signal provided to the gate driver. Based on the above, the transistor TFT1 and the transistor TFT2 are controlled by the same scan line SL and are disposed between the sub-pixel PX1 and the sub-pixel PX2 of the same color, as shown in FIG. 2A. However, the disclosure is not limited thereto. In other embodiments, the transistor TFT1 and the transistor TFT2 may be electrically connected to different scan lines SL, so that the transistor TFT1 is located between the adjacent sub-pixel PX1 and sub-pixel PX2 and the transistor TFT2 is located between the adjacent sub-pixel PX1 and sub-pixel PX2.

A common line CL is, for example, disposed on the substrate SB1, and also extends in the first direction d1, for example, but the disclosure is not limited thereto. The common line CL and the gate G of the transistor TFT belong to the same conductive layer, for example, and at least partially overlap the storage electrode SC in the normal direction n of the substrate SB1, for example, to form a storage capacitor Cst. In this embodiment, the same common line CL at least partially overlaps a storage electrode SC1 and a storage electrode SC2 in the normal direction n of the substrate SB1 to form a storage capacitor Cst1 and a storage capacitor Cst2 respectively, as shown in FIG. 1A. However, the disclosure is not limited thereto. In other embodiments, the storage electrode SC1 and the storage electrode SC2 may at least partially overlap different common lines CL in the normal direction n of the substrate SB1.

The data line DL is, for example, disposed on the substrate SB1, and extends, for example, in a second direction d2, where the second direction d2 is, for example, orthogonal to the first direction d1, but the disclosure is not limited thereto. The data line DL and a source S and a drain D of the transistor TFT belong to the same conductive layer, for example, and the data line DL may be, for example, electrically connected to the source S of the transistor TFT, for example, to provide a data signal from the source driver SD to the corresponding transistor TFT to drive the corresponding sub-pixel PX. In this embodiment, the data line DL includes a data line DL1 and a data line DL2. The data line DL1 is electrically connected to the source S1 of the transistor TFT1 and the data line DL2 is electrically connected to the source S2 of the transistor TFT2 to respectively provide corresponding data signals to the transistor TFT1 and the transistor TFT2. However, the disclosure is not limited thereto. In some other embodiments, the corresponding data signal may be provided to the transistor TFT1 and the transistor TFT2 through the same data line DL.

The storage electrode SC is, for example, disposed on the substrate SB1, and belongs to the same conductive layer as the source S and the drain D of the transistor TFT, for example. In some embodiments, the storage electrode SC is connected to the drain D, but the disclosure is not limited thereto. In this embodiment, the storage electrode SC includes a storage electrode SC1 and a storage electrode SC2. The storage electrode SC1 may form a storage capacitor Cst1 with the common line CL to store a signal input to the sub-pixel PX1, and the storage electrode SC2 may form a storage capacitor Cst2 with the common line CL to store a signal input to the sub-pixel PX2, but the disclosure is not limited thereto.

It is worth noting that the gate G of the transistor TFT, the scan line SL, and the common line CL each belong to a part of a first conductive layer M1, for example, and the source S and drain D of the transistor TFT, the data line DL, and the storage electrode SC each belong to a part of a second conductive layer M2.

The first insulating layer PV1 is, for example, disposed on the substrate SB1. In this embodiment, the first insulating layer PV1 may be disposed between the first conductive layer M1 and the substrate SB1 and at least partially cover the first conductive layer M1. A material of the first insulating layer PV1 may be, for example, an inorganic material (e.g., silicon oxide, silicon nitride, silicon oxynitride, or a stack layer of at least two of the above materials), an organic material (e.g., polytetrafluoroethylene, polyimide, parylene, benzocyclobutene, or other suitable materials), or a combination of the foregoing, but the disclosure is not limited thereto. The first insulating layer PV1 may have, for example, a single-layer structure or a multi-layer structure. For instance, the first insulating layer PV1 may have a single-layer structure and may be used as a gate insulating layer of the transistor TFT, but the disclosure is not limited thereto.

The second insulating layer PV2 is, for example, disposed on the first insulating layer PV1. In this embodiment, the second insulating layer PV2 may at least partially cover the second conductive layer M2. In this embodiment, the second insulation layer PV2 includes an opening PV2_OP1 and an opening PV2_OP2, where the opening PV2_OP1 and the opening PV2_OP2 respectively expose part of the storage electrode SC1 and part of the storage electrode SC2. A material of the second insulating layer PV2 may be, for example, an inorganic material (e.g., silicon oxide, silicon nitride, silicon oxynitride, or a stack layer of at least two of the above materials), an organic material (e.g., polytetrafluoroethylene, polyimide, parylene, benzocyclobutene, or other suitable materials), or a combination of the foregoing, but the disclosure is not limited thereto. The second insulating layer PV2 may have, for example, a single-layer structure or a multi-layer structure. For instance, the second insulating layer PV2 may have a multi-layer structure and may be used to electrically insulate part of the first conductive layer M1 from part of the second conductive layer M2 and/or to electrically insulate part of the second conductive layer M2 from the remaining conductive layers, but the disclosure is not limited thereto.

The reflective layer RL is, for example, disposed on the component layer CIL and corresponds to the reflective area RR, for example. In detail, the reflective layer RL may, for example, define the reflective area RR and the transmissive area TR (i.e., the area where the reflective layer RL is not provided in the normal direction n of the substrate SB1) of the display device 10 in the normal direction n of the substrate SB1. In some embodiments, a material of the reflective layer RL may include, for example, a material with high light reflectivity, which may include, for example, metal (chromium, gold, silver, copper, tin, lead, hafnium, tungsten, molybdenum, neodymium, titanium, tantalum, aluminum, zinc, or other suitable metals), the abovementioned alloy, the abovementioned metal oxide, the abovementioned metal nitride, a combination of the foregoing, or other conductive materials. Based on the above, when ambient light enters the display device 10, it can be reflected by the reflective layer RL. In this embodiment, the reflective layer RL is disposed on the second insulating layer PV2, but the disclosure is not limited thereto.

In this embodiment, a liquid crystal cell gap RR_CG1 of the reflective area RR is substantially the same as a liquid crystal cell gap TR_CG1 of the transmissive area in the liquid crystal module Ce1, but the disclosure is not limited thereto.

In some embodiments, the liquid crystal module Ce1 further includes a source driver SD, a substrate SB2, a liquid crystal cell LC, a pixel electrode layer PE, a light-shielding pattern BM, a light conversion layer CF, and a common electrode layer CE.

The source driver SD is disposed on the substrate SB1, for example. In this embodiment, the source driver SD may include a source driver SD1 and a source driver SD2. The source driver SD1 is, for example, electrically connected to the data line DL1, so that the reflective area RR receives, for example, a data signal DS1, and the source driver SD2 is, for example, electrically connected to the data line DL2, so that the transmissive area TR receives, for example, a data signal DS2, where the data signal DS1 and the data signal DS2 are different.

The substrate SB2 faces the substrate SB1 in the normal direction n of the substrate SB1, for example. The substrate SB2 may include, for example, the same or similar material as the substrate SB1, so description thereof is not repeated herein. In some embodiments, the substrate SB2 may be bonded to the substrate SB1 through sealant (not shown), but the disclosure is not limited thereto.

The liquid crystal cell LC is disposed between the substrate SB1 and the substrate SB2, for example. In some embodiments, liquid crystal molecules in the liquid crystal cell LC may be aligned, for example, by changes in voltage. For instance, when the display device 10 is not driven, the liquid crystal molecules may be aligned according to a rubbing direction (e.g., the first direction d1) of an alignment layer (not shown) disposed on the substrate SB1 and an alignment layer (not shown) disposed on the substrate SB2. In contrast, when the display device 10 is driven, the liquid crystal molecules may have a corresponding tilt direction according to the voltage between the two electrodes. In some embodiments, the liquid crystal cell LC may include electrically controlled birefringence (ECB) liquid crystal molecules, vertical alignment (VA) liquid crystal molecules, twisted nematic (TN) liquid crystal molecules, or other suitable liquid crystal molecules, but the disclosure is not limited thereto.

The pixel electrode layer PE is disposed on the component layer CIL, for example. In this embodiment, the pixel electrode layer PE is disposed on the second insulating layer PV2 and includes a pixel electrode layer PE1 and a pixel electrode layer PE2. The pixel electrode layer PE1 may be electrically connected to the drain D1 of the transistor TFT1 through, for example, the opening PV2_OP1, and the pixel electrode layer PE2 may be electrically connected to the drain D2 of the transistor TFT2 through, for example, the opening PV2_OP2. In this embodiment, the pixel electrode layer PE covers the reflective layer RL. In detail, the reflective layer RL provided to define the reflective area RR may be covered by the pixel electrode layer PE1, for example. Through this design, the reflective layer RL may reduce the possibility of being affected by external moisture and/or oxygen, thereby allowing the display device 10 to have improved optical performance in the reflective area RR. The method of forming the pixel electrode layer PE1 may, for example, include performing the following steps, but the disclosure is not limited thereto. First, a pixel electrode layer PE11 is formed on the second insulating layer PV2 using a suitable process such as sputtering. Next, after the reflective layer RL is formed on the pixel electrode layer PE11, a pixel electrode layer PE12 is formed on the pixel electrode layer PE11. Herein, the pixel electrode layer PE12 covers the reflective layer RL, so that the pixel electrode layer PE1 composed of the pixel electrode layer PE11 and the pixel electrode layer PE12 may cover the reflective layer RL. From another perspective, the pixel electrode layer PE12 is located on an upper surface and a side surface of the reflective layer RL, and the pixel electrode layer PE11 is located on a bottom surface of the reflective layer RL. In some embodiments, a material of the pixel electrode layer PE may include a metal oxide conductive material (e.g., indium tin oxide, indium zinc oxide, aluminum tin oxide, aluminum zinc oxide, and indium germanium zinc oxide), but the disclosure is not limited thereto.

The light-shielding pattern BM is disposed on the substrate SB2, for example. In some embodiments, the light-shielding pattern BM is disposed on a surface of the substrate SB2 facing the substrate SB1, but the disclosure is not limited thereto. A material of the light-shielding pattern BM may be, for example, black resin or a metal material with low reflectivity, so that the internal components and wiring of the display device 10 that are not intended to be seen by the user are shielded, and the display effect of the display device 10 is improved.

The light conversion layer CF is disposed on the substrate SB2, for example. In some embodiments, the light conversion layer CF is disposed on the surface of the substrate SB2 facing the substrate SB1, but the disclosure is not limited thereto. The light conversion layer CF includes a filter layer, quantum dots, fluorescence materials, phosphor materials, scattering particles, other suitable materials, or a combination thereof. The light conversion layer CF may convert light of different wavelengths or colors or filter light of different wavelengths or colors. The light conversion layer CF may include, for example, a red conversion pattern CF1, a green conversion pattern CF2, or a blue conversion pattern CF3, thereby allowing the display device 10 to have a color display screen, but the disclosure is not limited thereto.

The common electrode layer CE is disposed on the substrate SB2, for example. In some embodiments, the common electrode layer CE is disposed on the surface of the substrate SB2 facing the substrate SB1, but the disclosure is not limited thereto. In this embodiment, the common electrode layer CE is disposed between the substrate SB2 and the liquid crystal cell LC and is used to drive the liquid crystal molecules in the liquid crystal cell LC together with the pixel electrode layer PE. For instance, when driving the display device 10 of this embodiment, a voltage providing unit (not shown) may be used to provide voltages to the pixel electrode layer PE and the common electrode layer CE to drive the liquid crystal molecules in the liquid crystal cell LC, where a first voltage is applied to the pixel electrode layer PE, and a second voltage is applied to the common electrode layer CE. An absolute value of a voltage difference between the first voltage and the second voltage may determine a tilt angle of the liquid crystal molecules in the liquid crystal cell LC, so that the refractive index of the liquid crystal molecules may be accordingly changed, and the display device 10 of this embodiment may display images. In some embodiments, a material of the common electrode layer CE may be the same as or similar to the material of the pixel electrode layer PE, so description thereof is not repeated herein. In some embodiments, the common electrode layer CE and the pixel electrode PE are both disposed on the substrate SB1 and provide voltages to drive the liquid crystal molecules to deflect. For instance, it can be applied to fringe field switching (FFS) technology and in plane switching (IPS) technology.

Figure 3A:
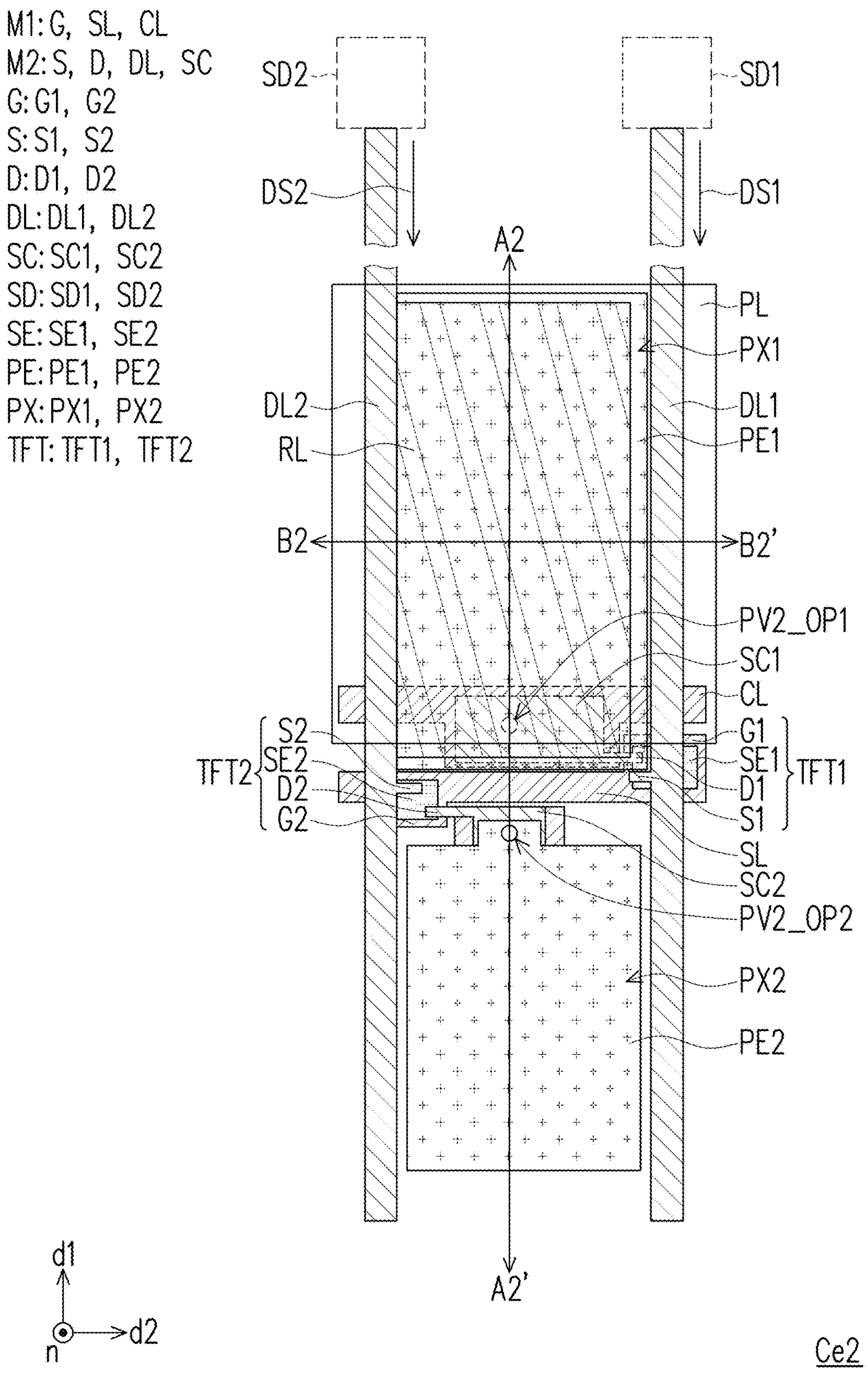
FIG. 3A is a schematic top view of a liquid crystal module according to a second embodiment of the disclosure.
Figure 3B:
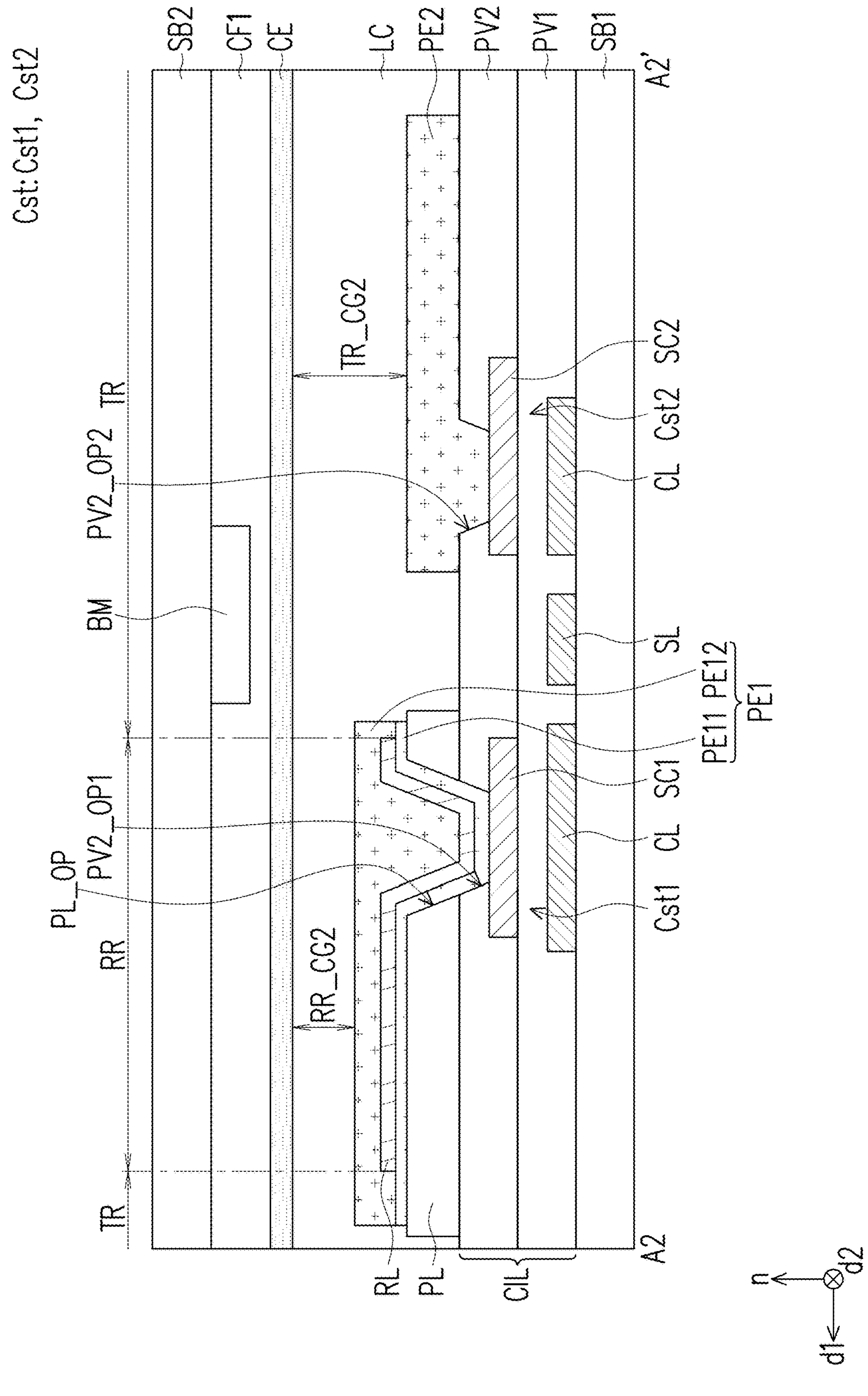
FIG. 3B is schematic top view taken along a cross-section line A2-A2' of FIG. 3A according to an embodiment.
Figure 3C:
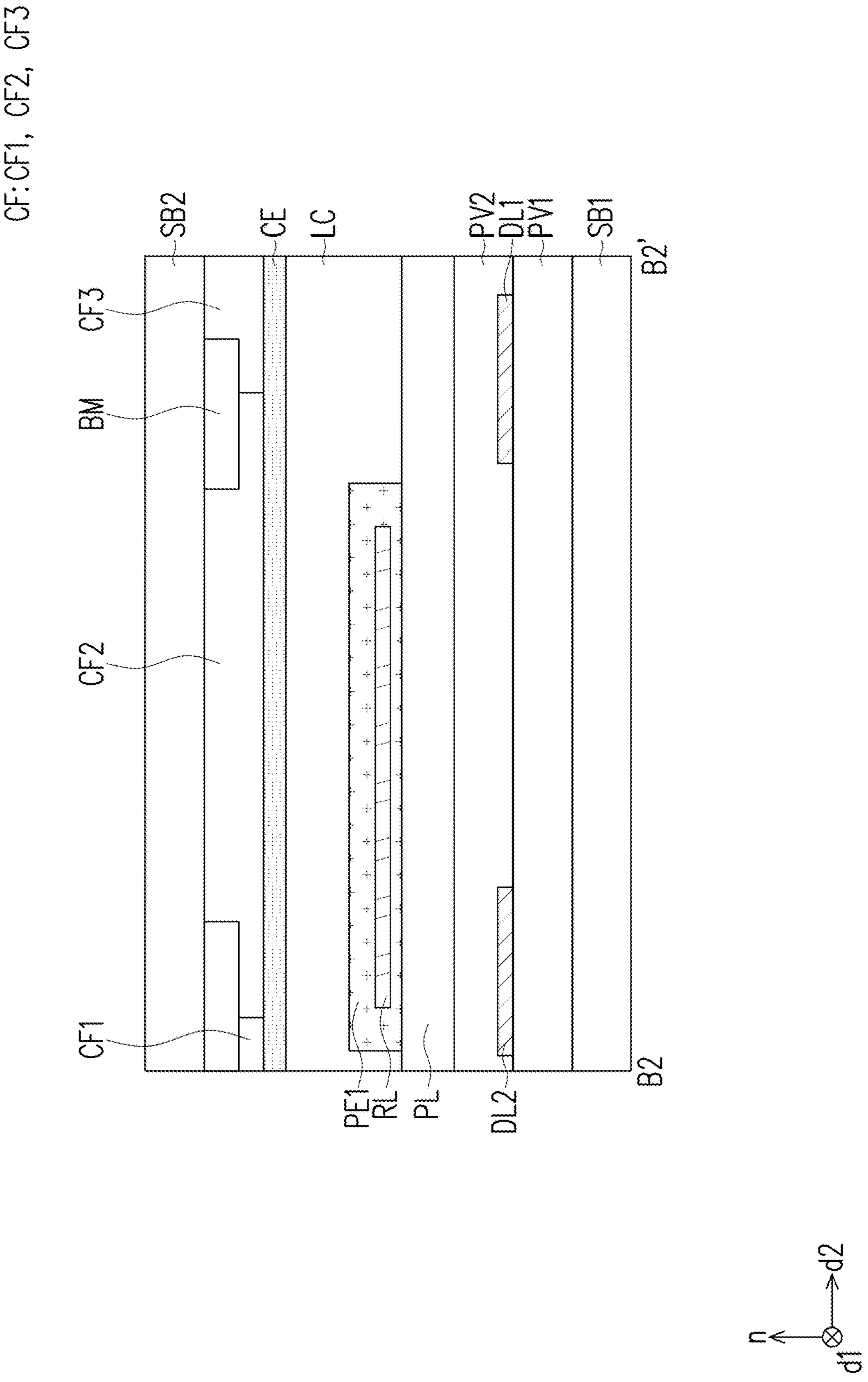
FIG. 3C is schematic top view taken along a cross-section line B2-B2' of FIG. 3A according to an embodiment.

FIG. 3A is a schematic top view of a liquid crystal module according to a second embodiment of the disclosure, FIG. 3B is schematic top view taken along a cross-section line A2-A2' of FIG. 3A according to an embodiment, and FIG. 3C is schematic top view taken along a cross-section line B2-B2' of FIG. 3A according to an embodiment. It should be mentioned that the reference numerals and part of the content provided in the embodiments shown in FIG. 2A to FIG. 2C may be applied in the embodiments shown in FIG. 3A to FIG. 3C, where the same or similar reference numerals serve to denote the same or similar components, and the description of the same technical content is omitted.

With reference to FIG. 3A to FIG. 3C, the main difference between a liquid crystal module Ce2 of this embodiment and the liquid crystal module Ce1 of the foregoing is that the liquid crystal module Ce2 further includes a planar layer PL.

The planar layer PL is disposed between the second insulating layer PV2 and the reflective layer RL, for example. That is, the reflective layer RL used to define the reflective area RR is disposed on the planar layer PL. Therefore, a liquid crystal cell gap RR_CG2 of the reflective area RR is different from a liquid crystal cell gap TR_CG2 of the transmissive area TR in the display device 10 of this embodiment, so that the display device 10 has dual liquid crystal cell gaps. In this embodiment, the liquid crystal cell gap RR_CG2 of the reflective area RR is smaller than the liquid crystal cell gap TR_CG2 of the transmissive area TR. For instance, the liquid crystal cell gap RR_CG2 of the reflective area RR may be half of the liquid crystal cell gap TR_CG2 of the transmissive area TR, so that the reflective area RR and the transmissive area TR of the display device 10 may display a same grayscale image.

In some embodiments, the planar layer PL includes an opening PL_OP, where the opening PL_OP communicates with the opening PV2_OP1 of the second insulating layer PV2 to expose part of the storage electrode SC1 together. A material of the planar layer PL may be, for example, an organic material (e.g., polytetrafluoroethylene, polyimide, parylene, benzocyclobutene, or other suitable materials), but the disclosure is not limited thereto.

Figure 4A:
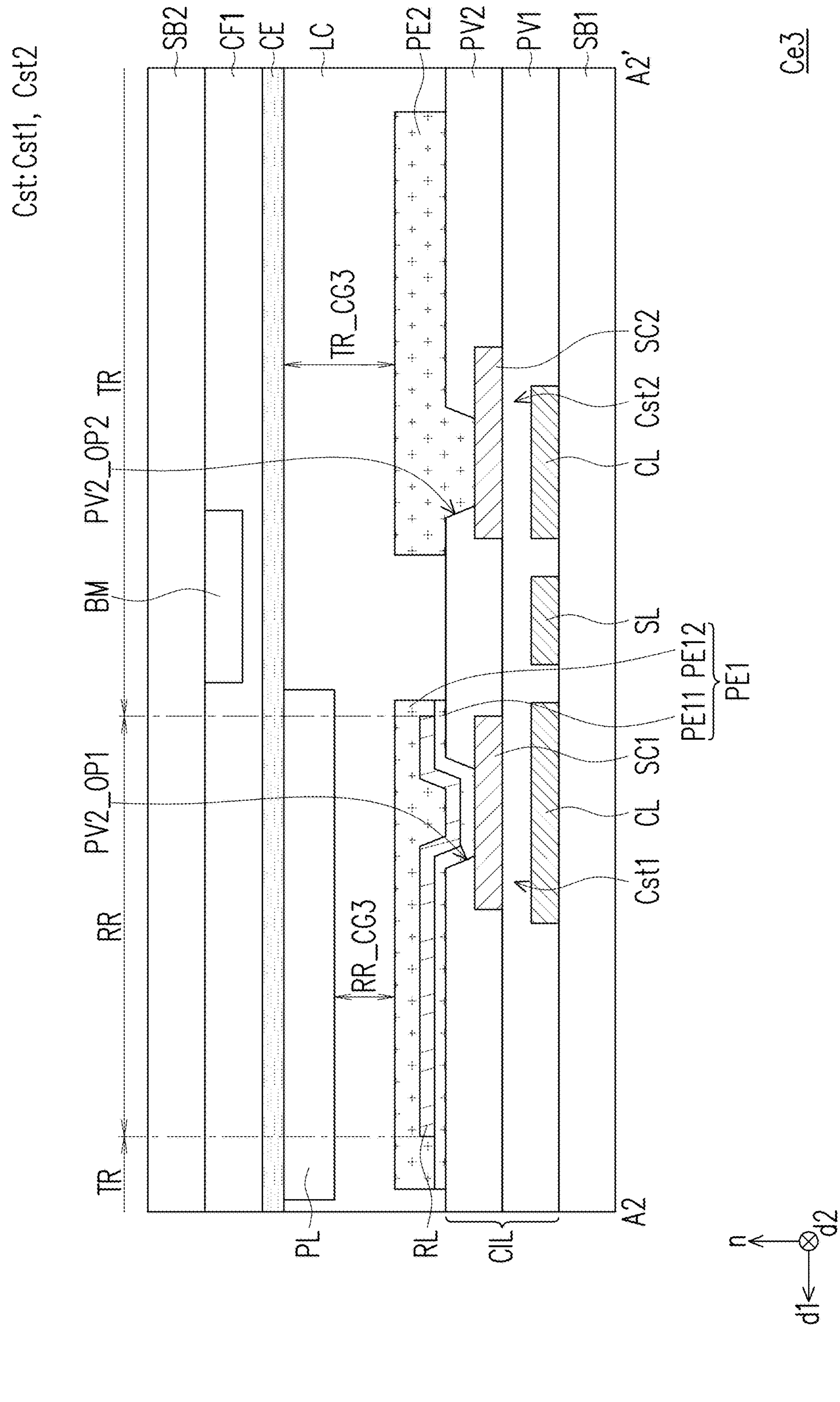
FIG. 4A is schematic top view taken along the cross-section line A2-A2' of FIG. 3A according to another embodiment.
Figure 4B:
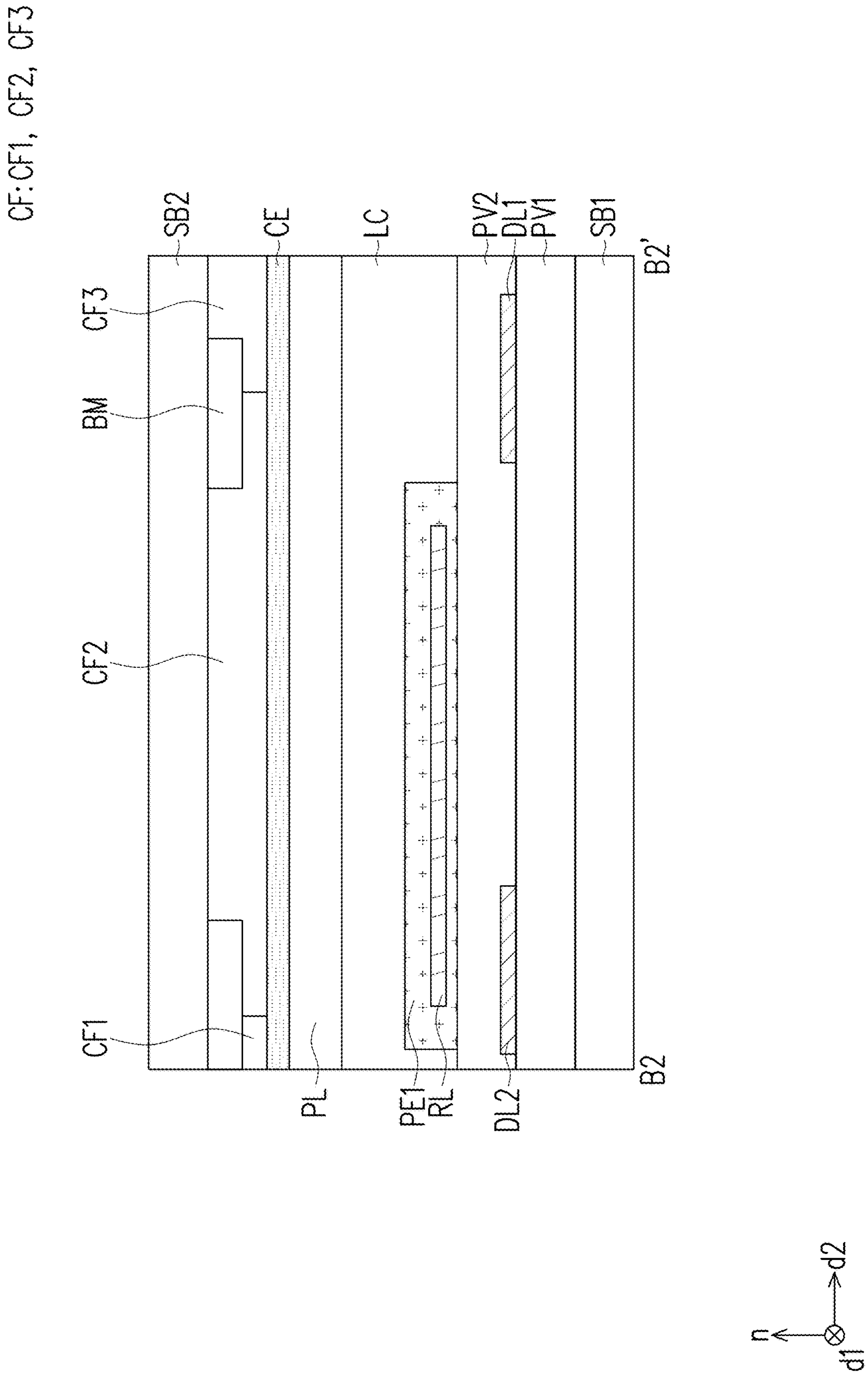
FIG. 4B is schematic top view taken along the cross-section line B2-B2' of FIG. 3A according to another embodiment.

FIG. 4A is schematic top view taken along the cross-section line A2-A2' of FIG. 3A according to another embodiment, and FIG. 4B is schematic top view taken along the cross-section line B2-B2' of FIG. 3A according to another embodiment. It should be mentioned that the reference numerals and part of the content provided in the embodiments shown in FIG. 3A to FIG. 3C may be applied in the embodiments shown in FIG. 4A to FIG. 4B, where the same or similar reference numerals serve to denote the same or similar components, and the description of the same technical content is omitted.

With reference to FIG. 4A to FIG. 4B, the main difference between a liquid crystal module Ce3 of this embodiment and the liquid crystal module Ce2 of the foregoing is that the planar layer PL is disposed on the substrate SB2.

In detail, the planar layer PL is disposed between the common electrode layer CE and the liquid crystal cell LC, for example. In this embodiment, the planar layer PL is provided corresponding to the reflective layer RL, so a liquid crystal cell gap RR_CG3 of the reflective area RR is different from a liquid crystal cell gap TR_CG3 of the transmissive area TR in the display device 10 of this embodiment. In this embodiment, the liquid crystal cell gap RR_CG3 of the reflective area RR is smaller than the liquid crystal cell gap TR_CG3 of the transmissive area TR. For instance, the liquid crystal cell gap RR_CG3 of the reflective area RR may be half of the liquid crystal cell gap TR_CG3 of the transmissive area TR, so that the reflective area RR and the transmissive area TR of the display device 10 may display the same grayscale image.

Figure 5A:
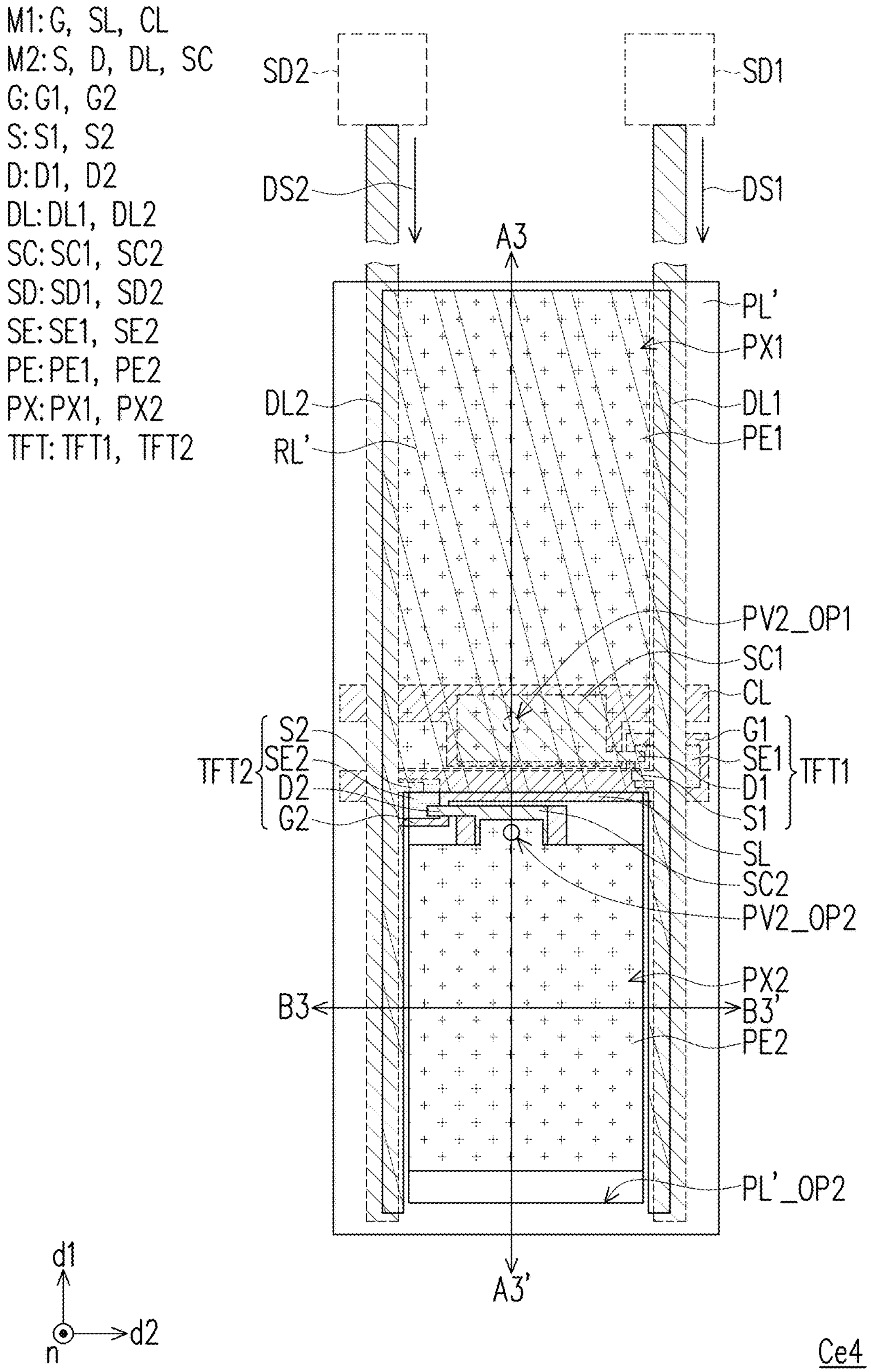
FIG. 5A is a schematic top view of a liquid crystal module according to a third embodiment of the disclosure.
Figure 5B:
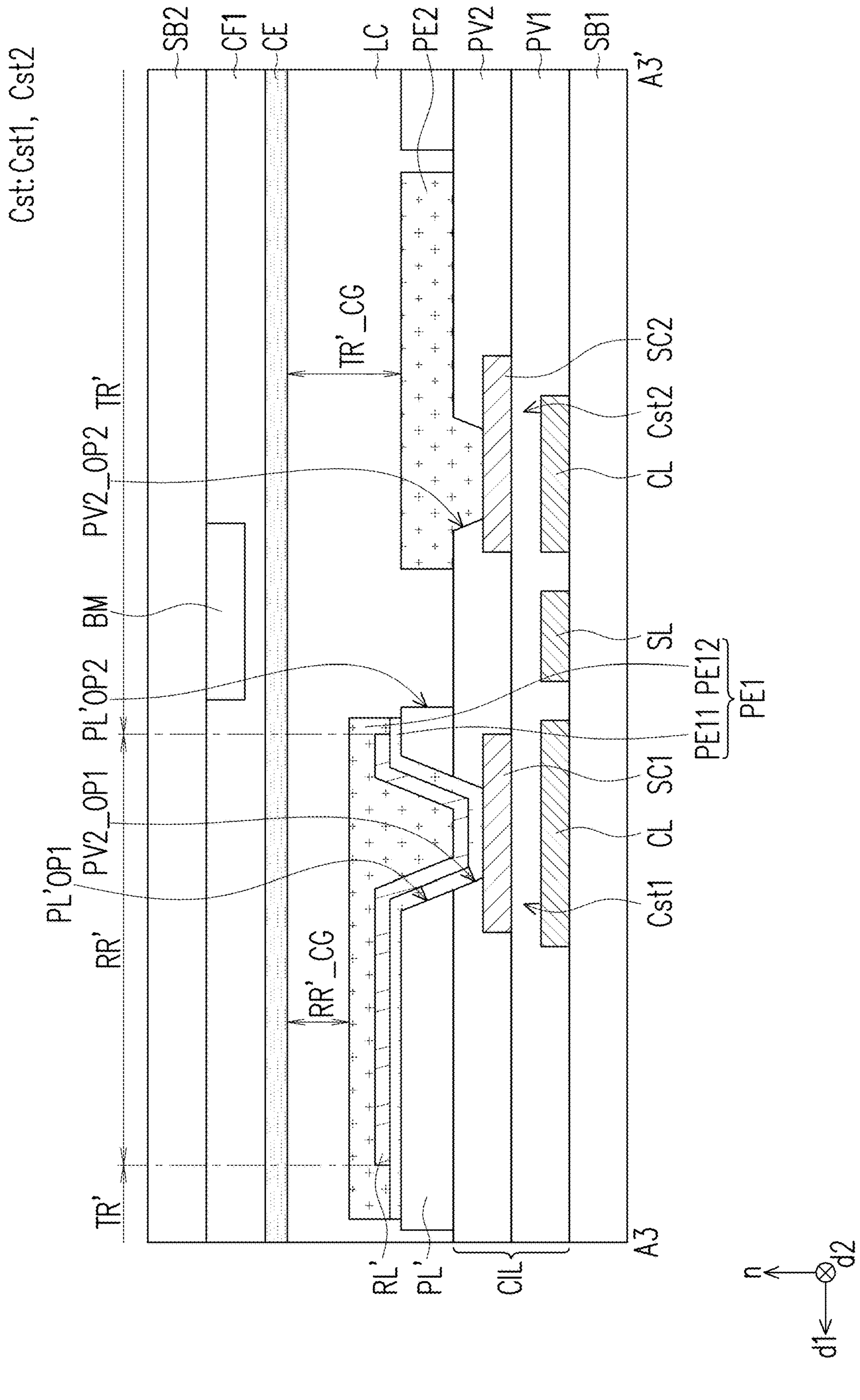
FIG. 5B is schematic top view taken along a cross-section line A3-A3' of FIG. 5A according to an embodiment.
Figure 5C:
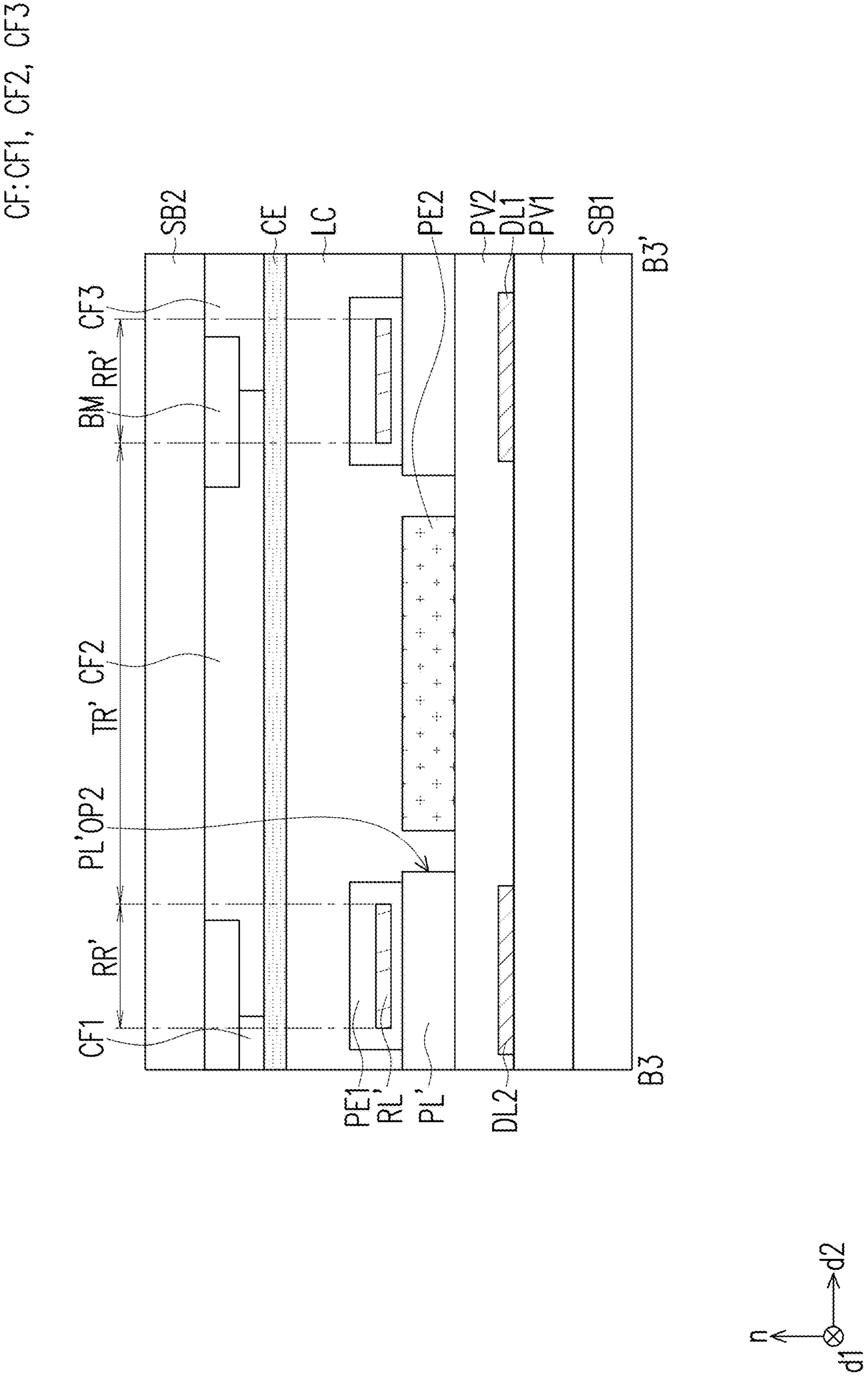
FIG. 5C is schematic top view taken along a cross-section line B3-B3' of FIG. 5A according to an embodiment.

FIG. 5A is a schematic top view of a liquid crystal module according to a third embodiment of the disclosure, FIG. 5B is schematic top view taken along a cross-section line A3-A3' of FIG. 5A according to an embodiment, and FIG. 5C is schematic top view taken along a cross-section line B3-B3' of FIG. 5A according to an embodiment. It should be mentioned that the reference numerals and part of the content provided in the embodiments shown in FIG. 3A to FIG. 3B may be applied in the embodiments shown in FIG. 5A to FIG. 5C, where the same or similar reference numerals serve to denote the same or similar components, and the description of the same technical content is omitted.

With reference to FIG. 5A to FIG. 5C, the main difference between a liquid crystal module Ce4 of this embodiment and the liquid crystal module Ce2 of the foregoing is that the liquid crystal module Ce4 has a larger reflective area RR'.

In this embodiment, in addition to an opening PL'_OP1, a planar layer PL' also includes an opening PL'_OP2 that exposes the pixel electrode layer PE2. Herein, a reflective layer RL' disposed on the planar layer PL' may be disposed around the pixel electrode layer PE2, so that the reflective layer RL' may define a relatively large reflective area RR'. In this embodiment, a liquid crystal cell gap RR'_CG of the reflective area RR' is different from a liquid crystal cell gap TR' CG of a transmissive area TR'. In this embodiment, the liquid crystal cell gap RR'_CG of the reflective area RR' is smaller than the liquid crystal cell gap TR'_CG of the transmissive area TR'. For instance, the liquid crystal cell gap RR'_CG of the reflective area RR' may be half of the liquid crystal cell gap TR'_CG of the transmissive area TR', so that the reflective area RR' and the transmissive area TR' of the display device 10 may display the same grayscale image.

Figure 6A:
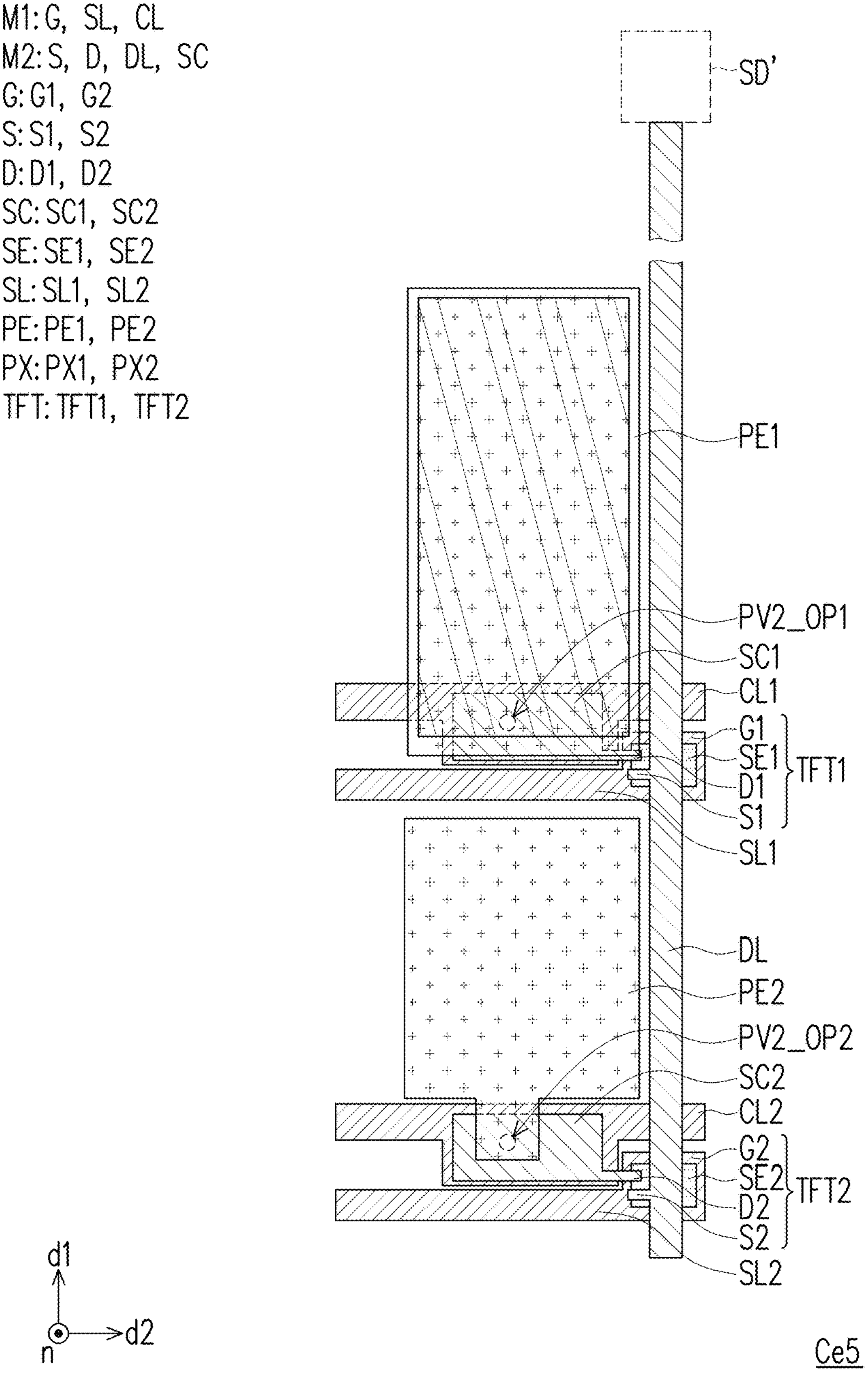
FIG. 6A is a schematic cross-sectional view of a liquid crystal module according to a fourth embodiment of the disclosure.
Figure 6B:
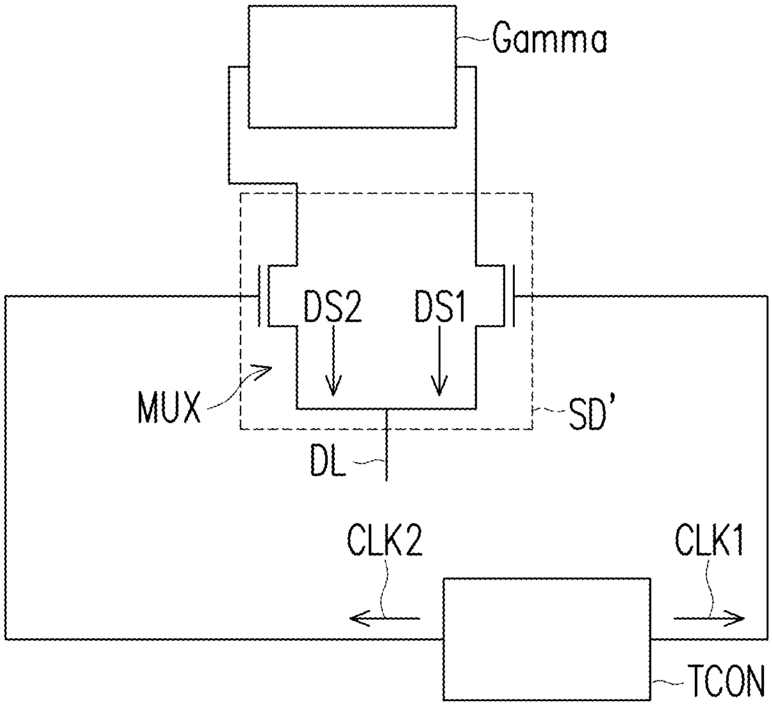
FIG. 6B is a circuit diagram of the liquid crystal module of FIG. 6A according to an embodiment.

FIG. 6A is a schematic cross-sectional view of a liquid crystal module according to a fourth embodiment of the disclosure, and FIG. 6B is a circuit diagram of the liquid crystal module of FIG. 6A according to an embodiment. It should be mentioned that the reference numerals and part of the content provided in the embodiments shown in FIG. 2A to FIG. 2B may be applied in the embodiments shown in FIG. 6A to FIG. 6B, where the same or similar reference numerals serve to denote the same or similar components, and the description of the same technical content is omitted.

With reference to FIG. 6A to FIG. 6B, the main difference between a liquid crystal module Ce5 of this embodiment and the liquid crystal module Ce1 of the foregoing is that the transistor TFT1 and the transistor TFT2 of the liquid crystal module Ce5 provide corresponding data signals through the same data line DL.

In this embodiment, the data signal DS1 and the data signal DS2 respectively received by the transistor TFT1 and the transistor TFT2 come from a same source driver SD'. In detail, the source driver SD' may include a multiplexer MUX, for example, where the multiplexer MUX may, for example, provide the corresponding data signal DS1 to the transistor TFT1 corresponding to the reflective area according to a sequence signal CLK1, so that the transistor TFT1 drives the sub-pixel located in the reflective area. Correspondingly, the multiplexer MUX may, for example, provide the corresponding data signal DS2 to the transistor TFT2 corresponding to the transmissive area according to a sequence signal CLK2, so that the transistor TFT2 drives the sub-pixel located in the transmissive area.

In this embodiment, the display device 10 may further include a sequence controller TCON and a gamma voltage generating unit Gamma. The sequence controller TCON is electrically connected to the source driver SD' for example, where the sequence controller TCON may, for example, provide the sequence signal CLK1 and the sequence signal CLK2 to the source driver SD', so that the source driver SD' can provide corresponding data signals at different time periods. The gamma voltage generating unit Gamma is electrically connected to the source driver SD', for example, where the gamma voltage generating unit Gamma can, for example, provide different gamma voltages to the source driver SD', so that the source driver SD' generates corresponding data signals, and that the images displayed by the display device 10 may better meet the needs of consumers.

In addition, in this embodiment, the scan line SL includes a scan line SL1 and a scan line SL2. The scan line SL1 is electrically connected to the gate G1 of the transistor TFT1 and the scan line SL2 is electrically connected to the gate G2 of the transistor TFT2 to respectively provide corresponding scan signals to the transistor TFT1 and the transistor TFT2. In this embodiment, the common line CL includes a common line CL1 and a common line CL2. The common line CL1 at least partially overlaps the storage electrode SC1 in the normal direction n of the substrate SB1 to form the storage capacitor Cst1, and the common line CL2 at least partially overlaps the storage electrode SC2 in the normal direction n of the substrate SB1 to form the storage capacitor Cst2.

Figure 7:
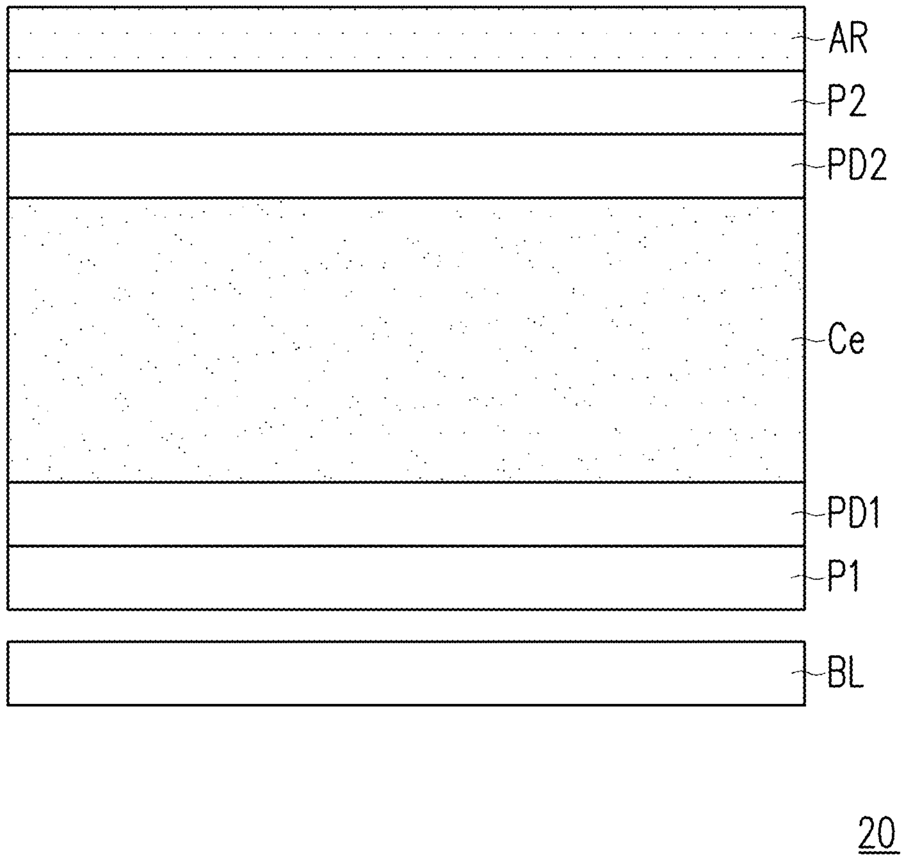
FIG. 7 is a schematic cross-sectional view of a display device according to the second embodiment of the disclosure.

FIG. 7 is a schematic cross-sectional view of a display device according to the second embodiment of the disclosure. It should be mentioned that the reference numerals and part of the content provided in the embodiments shown in FIG. 1 may be applied in the embodiments shown in FIG. 7, where the same or similar reference numerals serve to denote the same or similar components, and the description of the same technical content is omitted.

With reference to FIG. 7, the difference between a display device 20 of this embodiment and the display device 10 of the foregoing is that the display device 20 further includes a phase difference film PD2.

The phase difference film PD2 is disposed between the upper polarizing layer P2 and the liquid crystal module Ce, for example. The phase difference film PD2 may include a half-wave plate (HWP), a quarter-wave plate (QWP), or a combination thereof. In some embodiments, the phase difference film PD2 includes a half-wave plate and a quarter-wave plate. The quarter-wave plate is disposed between the upper polarizing layer P2 and the liquid crystal module Ce, and the half-wave plate may be disposed between the quarter-wave plate and the upper polarizing layer P2, but the disclosure is not limited thereto.

Figure 8:
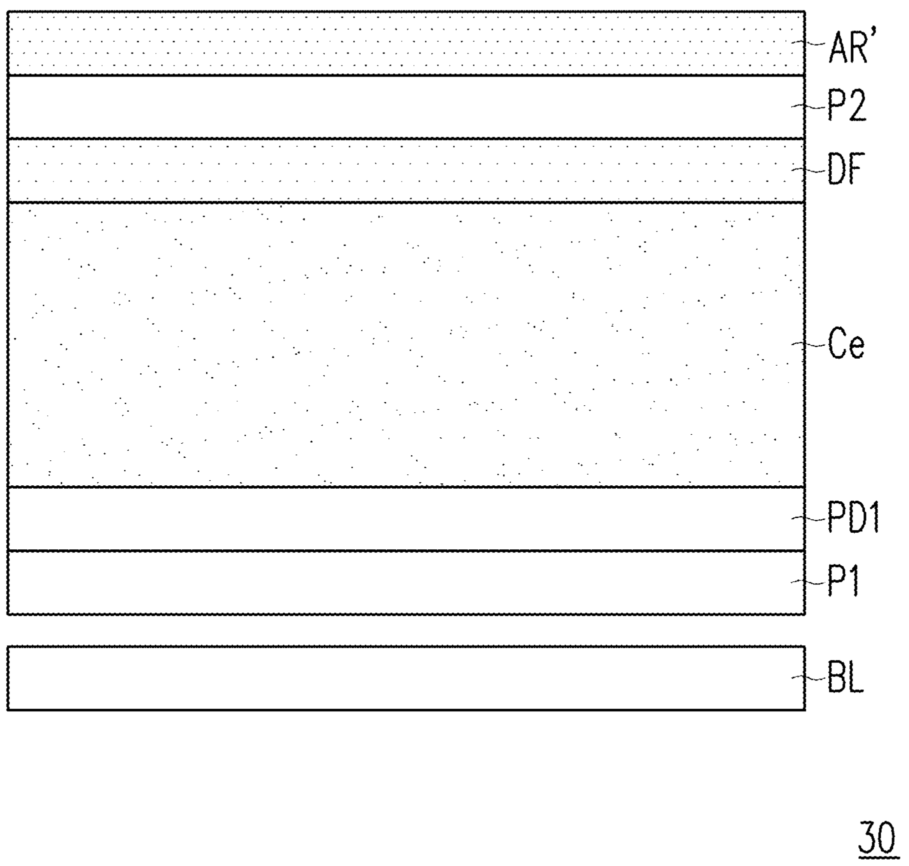
FIG. 8 is a schematic cross-sectional view of a display device according to the third embodiment of the disclosure.

FIG. 8 is a schematic cross-sectional view of a display device according to the third embodiment of the disclosure. It should be mentioned that the reference numerals and part of the content provided in the embodiments shown in FIG. 1 may be applied in the embodiments shown in FIG. 8, where the same or similar reference numerals serve to denote the same or similar components, and the description of the same technical content is omitted.

With reference to FIG. 8, the difference between a display device 30 of this embodiment and the display device 10 of the foregoing is that the display device 30 further includes a diffusion layer DF.

The diffusion layer DF is disposed between the upper polarizing layer P2 and the liquid crystal module Ce, for example. The diffusion layer DF may, for example, be used to diffuse light from the liquid crystal module Ce. In this embodiment, the diffusion layer DF has a haze of 10% to 80%. For instance, the haze of the diffusion layer DF may be 10%, 20%, 30%, 40%, 50%, 60%, 70%, 80%, any value between the aforementioned values, or a range of values consisting of any values, but the disclosure is not limited thereto. Through this design, brightness of the display device 30 may be evenly distributed at various viewing angles, while still having relatively high brightness under a wider viewing angle. That is, the arrangement of the diffusion layer DF may effectively improve the optical performance of the display device 30, and thereby, may provide consumers with an improved visual experience. The definition of haze may be, for example, a percentage of scattered light flux after the light is scattered by the diffusion layer DF to the total light flux of the light passing through the diffusion layer DF (i.e., the sum of scattered light flux and collimated light flux).

Based on the arrangement of the diffusion layer DF, the anti-reflective layer AR' of this embodiment may not have haze, but the disclosure is not limited thereto.

Figure 9:
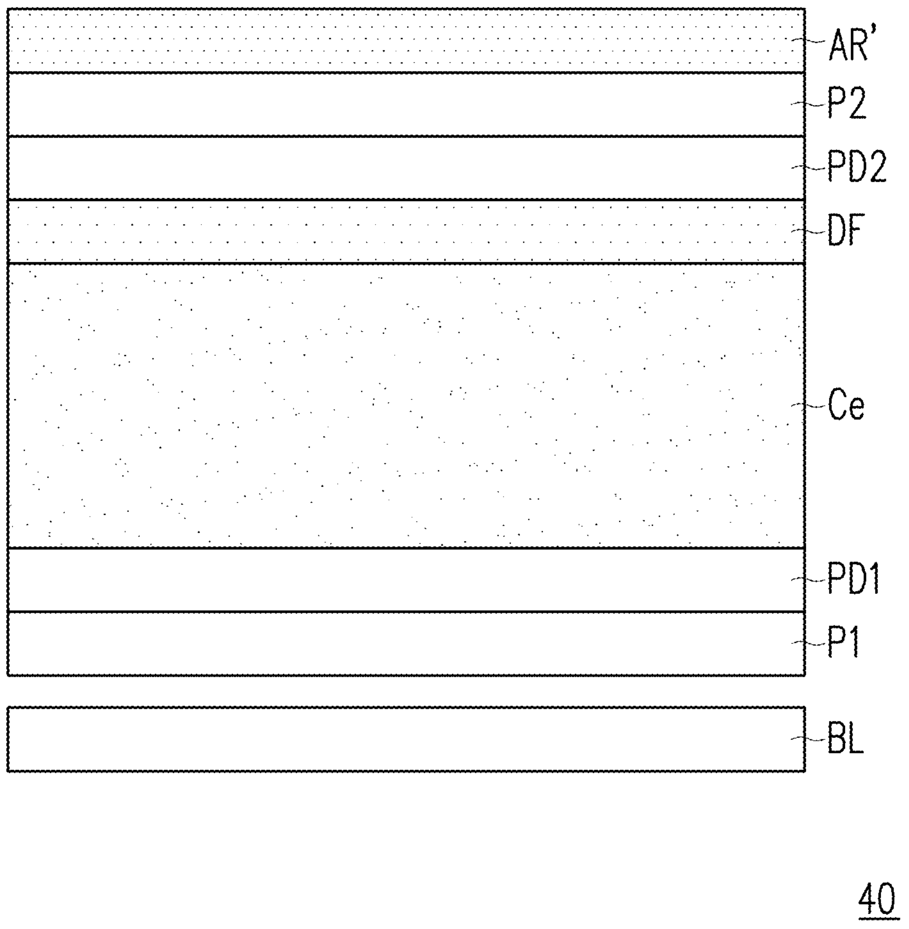
FIG. 9 is a schematic cross-sectional view of a display device according to the fourth embodiment of the disclosure.

FIG. 9 is a schematic cross-sectional view of a display device according to the fourth embodiment of the disclosure. It should be mentioned that the reference numerals and part of the content provided in the embodiments shown in FIG. 8 may be applied in the embodiments shown in FIG. 9, where the same or similar reference numerals serve to denote the same or similar components, and the description of the same technical content is omitted.

With reference to FIG. 9, the difference between a display device 40 of this embodiment and the display device 30 of the foregoing is that the display device 40 further includes the phase difference film PD2.

The phase difference film PD2 is disposed between the upper polarizing layer P2 and the diffusion layer DF, for example. A structure of the phase difference film PD2 may be, for example, the same as or similar to the structure of the phase difference film PD2 of the display device 20, so description thereof is not repeated herein.

In view of the foregoing, the transflective display device provided by the embodiments of the disclosure includes an anti-reflective layer with haze or a combination of an anti-reflective layer and a diffusion layer with haze. Therefore, the brightness of the semi-transflective display device may be evenly distributed at various viewing angles, while still having relatively high brightness under a wider viewing angle. Based on the above, the transflective display device provided by some embodiments of the disclosure may have improved optical performance.

Further, by providing an anti-reflective layer with haze or a combination of an anti-reflective layer and a diffusion layer with haze in the semi-transflective display device, the transflective display device provided by some embodiments of the disclosure does not need to form multiple bump structures in the reflective area, so that the process difficulty is lowered and/or the process yield is improved.

In the transflective display device provided by some other embodiments of the disclosure, the sub-pixels arranged in the reflective area and the transmissive area may be driven by independent signals, so that both the reflective area and the transmissive area in the transflective display device can exhibit improved optical performance.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device having a transmissive area and a reflective area, the transmissive area corresponding to a first sub-pixel, and the reflective area corresponding to a second sub-pixel, wherein the display device comprises:

a backlight module;

a liquid crystal module disposed on the backlight module, comprising:

a first substrate;

a component layer disposed on the first substrate and comprising a first transistor and a second transistor, wherein the first transistor is configured to drive the first sub-pixel, and the second transistor is configured to drive the second sub-pixel; and a reflective layer disposed on the component layer and corresponding to the reflective area;

an anti-reflective layer disposed on the liquid crystal module; and a diffusion layer disposed between the liquid crystal module and the anti-reflective layer, wherein the diffusion layer has a first haze greater than 30%, wherein the first haze of the diffusion layer is greater than a second haze of the anti-reflective layer, wherein the anti-reflective layer includes a plurality of first sub-layers and a plurality of second sub-layers stacked in an alternating manner, and a refractive index of the plurality of first sub-layers is greater than a refractive index of the plurality of second sub-layers.

2. The display device according to claim 1, wherein the second haze of the anti-reflective layer is greater than or equal to 30%.

3. The display device according to claim 1, wherein the second haze of the anti-reflective layer is zero.

4. The display device according to claim 1, further comprising a phase difference film disposed between the liquid crystal module and the backlight module.

5. The display device according to claim 1, further comprising:

a first phase difference film disposed between the liquid crystal module and the backlight module; and a second phase difference film disposed between the liquid crystal module and the anti-reflective layer.

6. The display device according to claim 1, wherein the liquid crystal module further comprises a pixel electrode layer disposed on the component layer and covering the reflective layer.

7. The display device according to claim 1, wherein the liquid crystal module comprises:

a liquid crystal cell; and a second substrate, wherein a light conversion layer is disposed on the second substrate, and the liquid crystal cell is disposed between the first substrate and the second substrate.

8. The display device according to claim 7, wherein the liquid crystal cell has a first liquid crystal cell gap corresponding to the reflective area and a second liquid crystal cell gap corresponding to the transmissive area, and the first liquid crystal cell gap is smaller than the second liquid crystal cell gap.

9. The display device according to claim 7, wherein the first liquid crystal cell gap of the reflective area in the liquid crystal module and the second liquid crystal cell gap of the transmissive area are substantially the same.

10. The display device according to claim 7, wherein the liquid crystal module further comprises:

a planar layer disposed on between the first substrate and the reflective layer.

11. The display device according to claim 7, wherein the liquid crystal module further comprises:

a planar layer disposed on between the second substrate and the reflective layer.

12. The display device according to claim 7, wherein the liquid crystal module further comprises a common electrode layer disposed between the second substrate and the pixel electrode layer.

13. The display device according to claim 1, wherein the first transistor receives a first data signal, the second transistor receives a second data signal, and the first data signal and the second data signal are different.

14. The display device according to claim 13, wherein the first data signal and the second data signal respectively come from a first data line and a second data line, and the first data line and the second data line respectively receive the first data signal and the second data signal from a first source driver and a second source driver.

15. The display device according to claim 13, wherein the first data signal and the second data signal come from a same source driver, the source driver comprises a multiplexer, the multiplexer provides the first data signal to the transmissive area according to a first sequence signal, and the multiplexer provides the second data signal to the reflective area according to a second sequence signal.

16. The display device according to claim 15, wherein the source driver is further electrically connected to a sequence controller, and the sequence controller provides the first sequence signal and the second sequence signal.

17. The display device according to claim 15, wherein the source driver is further electrically connected to a gamma voltage generating unit, and the gamma voltage generating unit provides different gamma voltages to the source driver.

* * * * *